US011351987B2

(12) United States Patent
Cormack et al.

(10) Patent No.: US 11,351,987 B2
(45) Date of Patent: Jun. 7, 2022

(54) PROACTIVE VEHICLE SAFETY SYSTEM

(71) Applicant: Intel Corporation, Santa Clara, CA (US)

(72) Inventors: Christopher J. Cormack, Portland, OR (US); Jeffrey R. Jackson, Newberg, OR (US); Stanley T. Mo, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 82 days.

(21) Appl. No.: 16/571,048

(22) Filed: Sep. 13, 2019

(65) Prior Publication Data

US 2020/0010077 A1    Jan. 9, 2020

(51) Int. Cl.

| | |
|---|---|
| *B60W 30/085* | (2012.01) |
| *G05B 13/02* | (2006.01) |
| *G05D 1/00* | (2006.01) |
| *B60W 40/08* | (2012.01) |
| *B60N 2/02* | (2006.01) |
| *B60W 50/08* | (2020.01) |
| *B60R 21/01* | (2006.01) |

(Continued)

(52) U.S. Cl.
CPC ......... *B60W 30/085* (2013.01); *B60N 2/0276* (2013.01); *B60R 21/01* (2013.01); *B60W 40/08* (2013.01); *B60W 50/087* (2013.01); *G05B 13/027* (2013.01); *G05D 1/0088* (2013.01); *B60R 21/34* (2013.01); *B60R 2021/01211* (2013.01); *B60W 30/09* (2013.01); *G05D 2201/0213* (2013.01)

(58) Field of Classification Search
CPC .. B60W 30/085; B60W 40/08; B60W 50/087; B60W 30/09; B60N 2/0276; B60R 21/01; B60R 2021/01211; B60R 21/34; G05B 13/027; G05D 1/0088; G05D 2201/0213
See application file for complete search history.

(56) References Cited

U.S. PATENT DOCUMENTS

| | | | | |
|---|---|---|---|---|
| 6,043,736 | A | * | 3/2000 | Sawahata ............... B60N 2/002 280/735 |
| 6,422,597 | B1 | * | 7/2002 | Pinsenschaum ...... B60R 21/233 280/735 |

(Continued)

FOREIGN PATENT DOCUMENTS

| | | | | | |
|---|---|---|---|---|---|
| CN | 108068803 | A | * | 5/2018 | ........ B60W 30/0956 |
| CN | 110481545 | A | * | 11/2019 | ......... B60G 17/0165 |

(Continued)

OTHER PUBLICATIONS

PCT International Search Report and Written Opinion issued in PCT/US2020/045984, dated Nov. 17, 2020; 16 pages.

*Primary Examiner* — Behrang Badii
*Assistant Examiner* — Jay Khandpur
(74) *Attorney, Agent, or Firm* — Alliance IP, LLC

(57) ABSTRACT

In one embodiment, an autonomous vehicle (AV) system determines that a collision between itself and another object is imminent based on data obtained from sensors attached to the AV. The AV system determines an optimal vehicle orientation for the collision, determines a vehicle path to position the vehicle in the optimal vehicle orientation, and autonomously controls the vehicle to travel along the determined vehicle path.

22 Claims, 14 Drawing Sheets

(51) Int. Cl.
*B60W 30/09* (2012.01)
*B60R 21/34* (2011.01)

(56) References Cited

U.S. PATENT DOCUMENTS

| | | | | |
|---|---|---|---|---|
| 6,724,920 | B1* | 4/2004 | Berenz | G06K 9/00221 180/169 |
| 9,701,307 | B1* | 7/2017 | Newman | B60W 30/095 |
| 10,435,150 | B1* | 10/2019 | Szefi | B64C 27/72 |
| 10,453,150 | B2* | 10/2019 | Thompson | G06Q 10/10 |
| 10,611,269 | B1* | 4/2020 | Larner | B60N 2/14 |
| 2001/0025214 | A1* | 9/2001 | Isonaga | B60R 21/01554 701/45 |
| 2003/0127837 | A1* | 7/2003 | Rajasingham | B60N 2/06 280/730.1 |
| 2004/0066023 | A1* | 4/2004 | Joseph | B60R 21/01526 280/735 |
| 2005/0236213 | A1* | 10/2005 | Hosoya | B60K 28/14 180/284 |
| 2006/0106538 | A1* | 5/2006 | Browne | B60R 21/01 701/301 |
| 2010/0023224 | A1* | 1/2010 | Stabrey | B60T 8/17551 701/45 |
| 2013/0054128 | A1* | 2/2013 | Moshchuk | B60W 10/18 701/301 |
| 2017/0008424 | A1* | 1/2017 | Denne | B60N 2/0276 |
| 2018/0075309 | A1* | 3/2018 | Sathyanarayana | G05D 1/0055 |
| 2018/0090016 | A1* | 3/2018 | Nishi | G05D 1/102 |
| 2018/0362033 | A1 | 12/2018 | Newman et al. | |
| 2020/0010077 | A1 | 1/2020 | Cormack et al. | |

FOREIGN PATENT DOCUMENTS

| | | |
|---|---|---|
| JP | 2006188129 A | 7/2006 |
| JP | 2016034814 A | 3/2016 |
| KR | 1020170070382 A | 6/2017 |
| WO | 2017079349 A1 | 5/2017 |

* cited by examiner

PROACTIVE VEHICLE SAFETY SYSTEM

TECHNICAL FIELD

This disclosure relates in general to the field of computer systems and, more particularly, to computing systems enabling safety techniques in autonomous vehicles.

BACKGROUND

Current vehicle safety systems are passive in nature; that is, they operate in response to a collision occurring, regardless of the angle, direction, or force of the impact. For instance, current vehicle safety systems may include passive mechanisms such as fixed location airbags with programmed inflation rates and fixed impact sensors which actuate based on programmed acceleration rates. These items might not be aware of the prior state of the car before impact or what the vehicle will do during impact, which may impact passenger safety and deployment of internal safety devices. Passenger safety may accordingly vary depending on the direction or force of impact, position of the passengers, and the object that the vehicle is impacting.

BRIEF DESCRIPTION OF THE DRAWINGS

Like reference numbers and designations in the various drawings indicate like elements.

DETAILED DESCRIPTION

Figure 1:
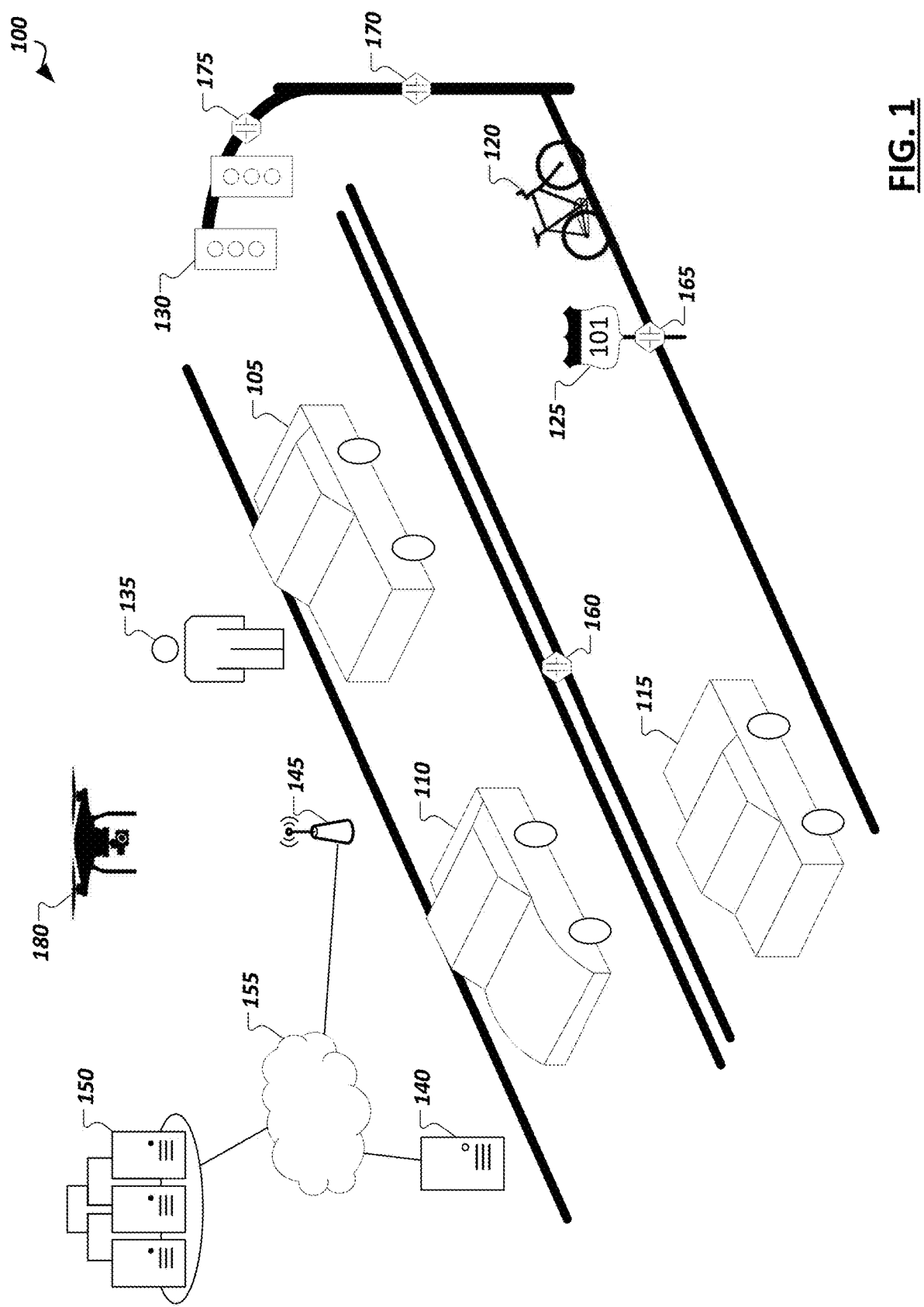
FIG. 1 is a simplified illustration showing an example autonomous driving environment.

FIG. 1 is a simplified illustration 100 showing an example autonomous driving environment. Vehicles (e.g., 105, 110, 115, etc.) may be provided with varying levels of autonomous driving capabilities facilitated through in-vehicle computing systems with logic implemented in hardware, firmware, and/or software to enable respective autonomous driving stacks. Such autonomous driving stacks may allow vehicles to self-control or provide driver assistance to detect roadways, navigate from one point to another, detect other vehicles and road actors (e.g., pedestrians (e.g., 135), bicyclists, etc.), detect obstacles and hazards (e.g., 120), and road conditions (e.g., traffic, road conditions, weather conditions, etc.), and adjust control and guidance of the vehicle accordingly.

In some implementations, vehicles (e.g., 105, 110, 115) within the environment may be "connected" in that the in-vehicle computing systems include communication modules to support wireless communication using one or more technologies (e.g., IEEE 802.11 communications (e.g., WiFi), cellular data networks (e.g., 3rd Generation Partnership Project (3GPP) networks, Global System for Mobile Communication (GSM), general packet radio service, code division multiple access (CDMA), etc.), Bluetooth, millimeter wave (mmWave), ZigBee, Z-Wave, etc.), allowing the in-vehicle computing systems to connect to and communicate with other computing systems, such as the in-vehicle computing systems of other vehicles, roadside units, cloud-based computing systems, or other supporting infrastructure. For instance, in some implementations, vehicles (e.g., 105, 110, 115) may communicate with computing systems providing sensors, data, and services in support of the vehicles' own autonomous driving capabilities. For instance, as shown in the illustrative example of FIG. 1, supporting drones 180 (e.g., ground-based and/or aerial), roadside computing devices (e.g., 140), various external (to the vehicle, or "extraneous") sensor devices (e.g., 160, 165, 170, 175, etc.), and other devices may be provided as autonomous driving infrastructure separate from the computing systems, sensors, and logic implemented on the vehicles (e.g., 105, 110, 115) to support and improve autonomous driving results provided through the vehicles, among other examples. Vehicles may also communicate with other connected vehicles over wireless communication channels to share data and coordinate movement within an autonomous driving environment, among other example communications.

As illustrated in the example of FIG. 1, the autonomous driving infrastructure may incorporate a variety of different systems. Such systems may vary depending on the location, with more developed roadways (e.g., roadways controlled by specific municipalities or toll authorities, roadways in urban areas, sections of roadways known to be problematic for autonomous vehicles, etc.) having a greater number or more advanced supporting infrastructure devices than other sections of roadway, etc. For instance, supplemental sensor devices (e.g., 160, 165, 170, 175) may be provided, which include sensors for observing portions of roadways and vehicles moving within the environment and generating corresponding data describing or embodying the observations of the sensors. As examples, sensor devices may be embedded within the roadway itself (e.g., sensor 160), on roadside or overhead signage (e.g., sensor 165 on sign 125), sensors (e.g., 170, 175) attached to electronic roadside equipment or fixtures (e.g., traffic lights (e.g., 130), electronic road signs, electronic billboards, etc.), dedicated road side units (e.g., 140), among other examples. Sensor devices may also include communication capabilities to communicate their collected sensor data directly to nearby connected vehicles or to fog- or cloud-based computing systems (e.g., 140, 150). Vehicles may obtain sensor data collected by external sensor devices (e.g., 160, 165, 170, 175, 180), or data embodying observations or recommendations generated by other systems (e.g., 140, 150) based on sensor data from these sensor devices (e.g., 160, 165, 170, 175, 180), and use this data in sensor fusion, inference, path planning, and other tasks performed by the in-vehicle autonomous driving system. In some cases, such extraneous sensors and sensor data may, in actuality, be within the vehicle, such as in the form of an after-market sensor attached to the vehicle, a personal computing device (e.g., smartphone, wearable, etc.) carried or worn by passengers of the vehicle, etc. Other road actors, including pedestrians, bicycles, drones, electronic scooters, etc., may also be provided with or carry sensors to generate sensor data describing an autonomous driving environment, which may be used and consumed by autonomous vehicles, cloud- or fog-based support systems (e.g., 140, 150), other sensor devices (e.g., 160, 165, 170, 175, 180), among other examples.

As autonomous vehicle systems may possess varying levels of functionality and sophistication, support infrastructure may be called upon to supplement not only the sensing capabilities of some vehicles, but also the computer and machine learning functionality enabling autonomous driving functionality of some vehicles. For instance, compute resources and autonomous driving logic used to facilitate machine learning model training and use of such machine learning models may be provided on the in-vehicle computing systems entirely or partially on both the in-vehicle systems and some external systems (e.g., 140, 150). For instance, a connected vehicle may communicate with roadside units, edge systems, or cloud-based devices (e.g., 140) local to a particular segment of roadway, with such devices (e.g., 140) capable of providing data (e.g., sensor data aggregated from local sensors (e.g., 160, 165, 170, 175, 180) or data reported from sensors of other vehicles), performing computations (as a service) on data provided by a vehicle to supplement the capabilities native to the vehicle, and/or push information to passing or approaching vehicles (e.g., based on sensor data collected at the device 140 or from nearby sensor devices, etc.). A connected vehicle (e.g., 105, 110, 115) may also or instead communicate with cloud-based computing systems (e.g., 150), which may provide similar memory, sensing, and computational resources to enhance those available at the vehicle. For instance, a cloud-based system (e.g., 150) may collect sensor data from a variety of devices in one or more locations and utilize this data to build and/or train machine-learning models which may be used at the cloud-based system (to provide results to various vehicles (e.g., 105, 110, 115) in communication with the cloud-based system 150, or to push to vehicles for use by their in-vehicle systems, among other example implementations. Access points (e.g., 145), such as cell-phone towers, road-side units, network access points mounted to various roadway infrastructure, access points provided by neighboring vehicles or buildings, and other access points, may be provided within an environment and used to facilitate communication over one or more local or wide area networks (e.g., 155) between cloud-based systems (e.g., 150) and various vehicles (e.g., 105, 110, 115). Through such infrastructure and computing systems, it should be appreciated that the examples, features, and solutions discussed herein may be performed entirely by one or more of such in-vehicle computing systems, fog-based or edge computing devices, or cloud-based computing systems, or by combinations of the foregoing through communication and cooperation between the systems.

In general, "servers," "clients," "computing devices," "network elements," "hosts," "platforms", "sensor devices," "edge device," "autonomous driving systems", "autonomous vehicles", "fog-based system", "cloud-based system", and "systems" generally, etc. discussed herein can include electronic computing devices operable to receive, transmit, process, store, or manage data and information associated with an autonomous driving environment. As used in this document, the term "computer," "processor," "processor device," or "processing device" is intended to encompass any suitable processing apparatus, including central processing units (CPUs), graphical processing units (GPUs), application specific integrated circuits (ASICs), field programmable gate arrays (FPGAs), digital signal processors (DSPs), tensor processors and other matrix arithmetic processors, among other examples. For example, elements shown as single devices within the environment may be implemented using a plurality of computing devices and processors, such as server pools including multiple server computers. Further, any, all, or some of the computing devices may be adapted to execute any operating system, including Linux, UNIX, Microsoft Windows, Apple OS, Apple iOS, Google Android, Windows Server, etc., as well as virtual machines adapted to virtualize execution of a particular operating system, including customized and proprietary operating systems.

Any of the flows, methods, processes (or portions thereof) or functionality of any of the various components described below or illustrated in the FIGs. may be performed by any suitable computing logic, such as one or more modules, engines, blocks, units, models, systems, or other suitable computing logic. Reference herein to a "module", "engine", "block", "unit", "model", "system" or "logic" may refer to hardware, firmware, software and/or combinations of each to perform one or more functions. As an example, a module, engine, block, unit, model, system, or logic may include one or more hardware components, such as a micro-controller or processor, associated with a non-transitory medium to store code adapted to be executed by the micro-controller or processor. Therefore, reference to a module, engine, block, unit, model, system, or logic, in one embodiment, may refers to hardware, which is specifically configured to recognize and/or execute the code to be held on a non-transitory medium. Furthermore, in another embodiment, use of module, engine, block, unit, model, system, or logic refers to the non-transitory medium including the code, which is specifically adapted to be executed by the microcontroller or processor to perform predetermined operations. And as can be inferred, in yet another embodiment, a module, engine, block, unit, model, system, or logic may refer to the combination of the hardware and the non-transitory medium. In various embodiments, a module, engine, block, unit, model, system, or logic may include a microprocessor or other processing element operable to execute software instructions, discrete logic such as an application specific integrated circuit (ASIC), a programmed logic device such as a field programmable gate array (FPGA), a memory device containing instructions, combinations of logic devices (e.g., as would be found on a printed circuit board), or other suitable hardware and/or software. A module, engine, block, unit, model, system, or logic may include one or more gates or other circuit components, which may be implemented by, e.g., transistors. In some embodiments, a module, engine, block, unit, model, system, or logic may be fully embodied as software. Software may be embodied as a software package, code, instructions, instruction sets and/or data recorded on non-transitory computer readable storage medium. Firmware may be embodied as code, instructions or instruction sets and/or data that are hard-coded (e.g., nonvolatile) in memory devices. Furthermore, logic boundaries that are illustrated as separate commonly vary and potentially overlap. For example, a first and second module (or multiple engines, blocks, units, models, systems, or logics) may share hardware, software, firmware, or a combination thereof, while potentially retaining some independent hardware, software, or firmware.

The flows, methods, and processes described below and in the FIGs. are merely representative of functions that may be performed in particular embodiments. In other embodiments, additional functions may be performed in the flows, methods, and processes. Various embodiments of the present disclosure contemplate any suitable signaling mechanisms for accomplishing the functions described herein. Some of the functions illustrated herein may be repeated, combined, modified, or deleted within the flows, methods, and processes where appropriate. Additionally, functions may be performed in any suitable order within the flows, methods, and processes without departing from the scope of particular embodiments.

Figure 2:
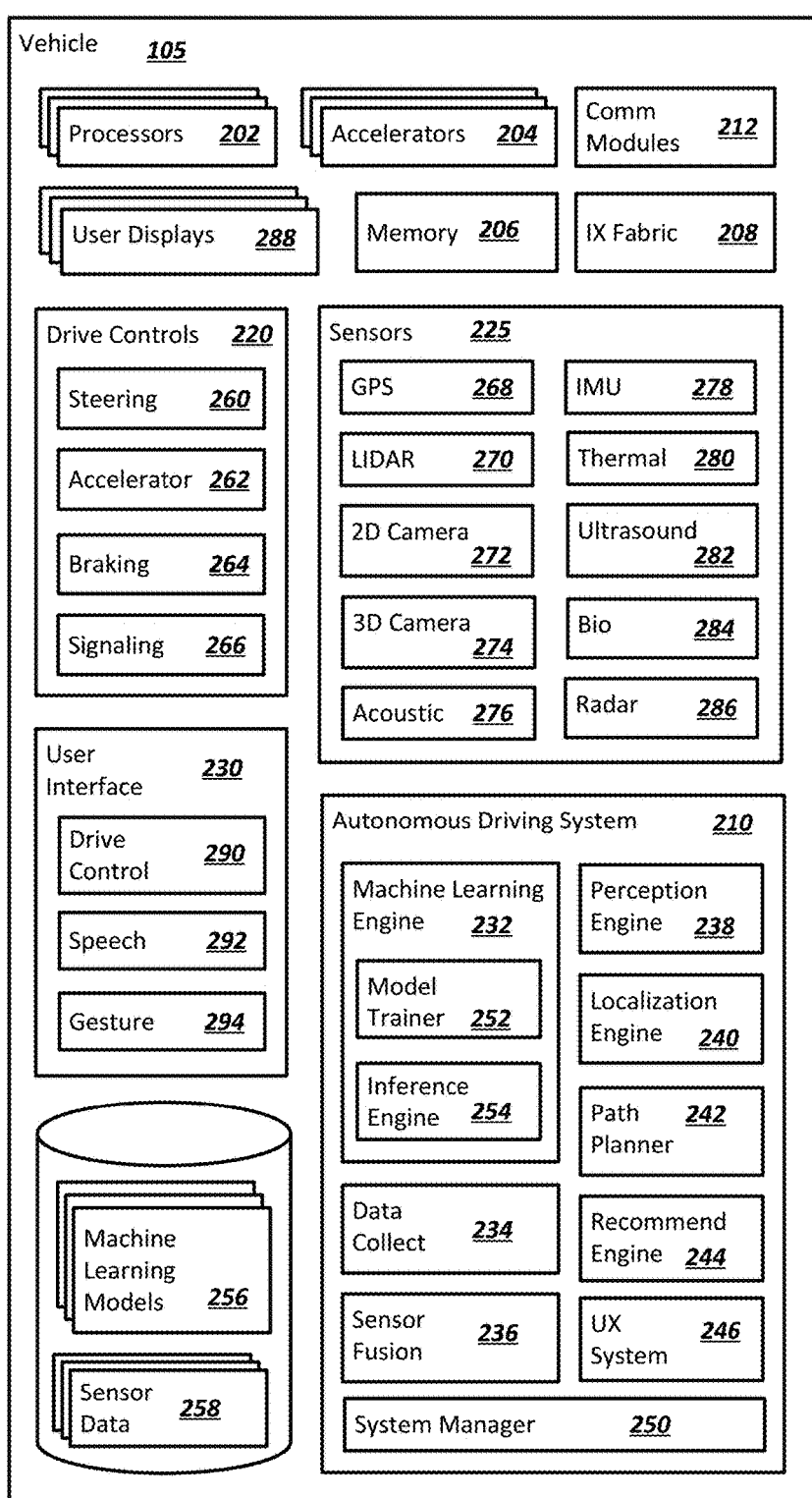
FIG. 2 is a simplified block diagram illustrating an example implementation of a vehicle equipped with autonomous driving functionality.
Figure 2:
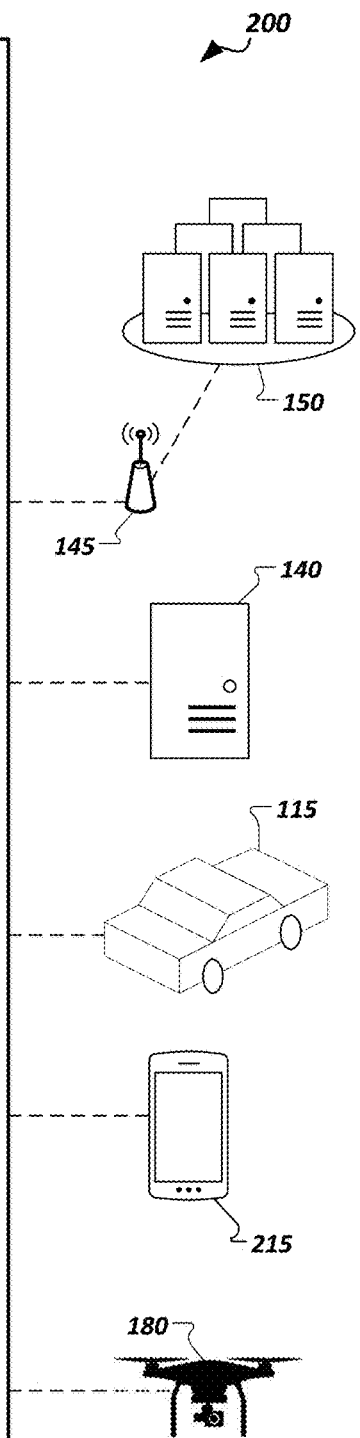

With reference now to FIG. 2, a simplified block diagram 200 is shown illustrating an example implementation of a vehicle (and corresponding in-vehicle computing system) 105 equipped with autonomous driving functionality. In one example, a vehicle 105 may be equipped with one or more processors 202, such as central processing units (CPUs), graphical processing units (GPUs), application specific integrated circuits (ASICs), field programmable gate arrays (FPGAs), digital signal processors (DSPs), tensor processors and other matrix arithmetic processors, among other examples. Such processors 202 may be coupled to or have integrated hardware accelerator devices (e.g., 204), which may be provided with hardware to accelerate certain processing and memory access functions, such as functions relating to machine learning inference or training (including any of the machine learning inference or training described below), processing of particular sensor data (e.g., camera image data, LIDAR point clouds, etc.), performing certain arithmetic functions pertaining to autonomous driving (e.g., matrix arithmetic, convolutional arithmetic, etc.), among other examples. One or more memory elements (e.g., 206) may be provided to store machine-executable instructions implementing all or a portion of any one of the modules or sub-modules of an autonomous driving stack implemented on the vehicle, as well as storing machine learning models (e.g., 256), sensor data (e.g., 258), and other data received, generated, or used in connection with autonomous driving functionality to be performed by the vehicle (or used in connection with the examples and solutions discussed herein). Various communication modules (e.g., 212) may also be provided, implemented in hardware circuitry and/or software to implement communication capabilities used by the vehicle's system to communicate with other extraneous computing systems over one or more network channels employing one or more network communication technologies. These various processors 202, accelerators 204, memory devices 206, and network communication modules 212, may be interconnected on the vehicle system through one or more interconnect fabrics or links (e.g., 208), such as fabrics utilizing technologies such as a Peripheral Component Interconnect Express (PCIe), Ethernet, OpenCAPI™, Gen-Z™, UPI, Universal Serial Bus, (USB), Cache Coherent Interconnect for Accelerators (CCIX™), Advanced Micro Device™'s (AMD™) Infinity™, Common Communication Interface (CCI), or Qualcomm™'s Centriq™ interconnect, among others.

Continuing with the example of FIG. 2, an example vehicle (and corresponding in-vehicle computing system) 105 may include an autonomous driving system 210, driving controls (e.g., 220), sensors (e.g., 225), and user/passenger interface(s) (e.g., 230), among other example modules implemented functionality of the autonomous vehicle in hardware and/or software. For instance, an autonomous driving system 210, in some implementations, may implement all or a portion of an autonomous driving stack and process flow (e.g., as shown and discussed in the example of FIG. 5). A machine learning engine 232 may be provided to utilize various machine learning models (e.g., 256) provided at the vehicle 105 in connection with one or more autonomous functions and features provided and implemented at or for the vehicle, such as discussed in the examples herein. Such machine learning models 256 may include artificial neural network models, convolutional neural networks, decision tree-based models, support vector machines (SVMs), Bayesian models, deep learning models, and other example models. In some implementations, an example machine learning engine 232 may include one or more model trainer engines 252 to participate in training (e.g., initial training, continuous training, etc.) of one or more of the machine learning models 256. One or more inference engines 254 may also be provided to utilize the trained machine learning models 256 to derive various inferences, predictions, classifications, and other results. In some embodiments, the machine learning model training or inference described herein may be performed off-vehicle, such as by computing system 140 or 150.

The machine learning engine(s) 232 provided at the vehicle may be utilized to support and provide results for use by other logical components and modules of the autonomous driving system 210 implementing an autonomous driving stack and other autonomous-driving-related features. For instance, the data collection module 234 may be provided with logic to determine sources from which data is to be collected (e.g., for inputs in the training or use of various machine learning models 256 used by the vehicle). For instance, the particular source (e.g., internal sensors (e.g., 225) or extraneous sources (e.g., 115, 140, 150, 180, 215, etc.)) may be selected, as well as the frequency and fidelity at which the data is sampled is selected. In some cases, such selections and configurations may be made at least partially autonomously by the data collection module 234 using one or more corresponding machine learning models (e.g., to collect data as appropriate given a particular detected scenario).

A sensor fusion module 236 may also be used to govern the use and processing of the various sensor inputs utilized by the machine learning engine 232 and other modules (e.g., 238, 240, 242, 244, 246, etc.) of the autonomous driving system. One or more sensor fusion modules (e.g., 236) may be provided, which may derive an output from multiple sensor data sources (e.g., on the vehicle or extraneous to the vehicle). The sources may be homogenous or heterogeneous types of sources (e.g., multiple inputs from multiple instances of a common type of sensor, or from instances of multiple different types of sensors). An example sensor fusion module 236 may apply direct fusion, indirect fusion, among other example sensor fusion techniques. The output of the sensor fusion may, in some cases by fed as an input (along with potentially additional inputs) to another module of the autonomous driving system and/or one or more machine learning models in connection with providing autonomous driving functionality or other functionality, such as described in the example solutions discussed herein.

A perception engine 238 may be provided in some examples, which may take as inputs various sensor data (e.g., 258) including data, in some instances, from extraneous sources and/or sensor fusion module 236 to perform object recognition and/or tracking of detected objects, among other example functions corresponding to autonomous perception of the environment encountered (or to be encountered) by the vehicle 105. Perception engine 238 may perform object recognition from sensor data inputs using deep learning, such as through one or more convolutional neural networks and other machine learning models 256. Object tracking may also be performed to autonomously estimate, from sensor data inputs, whether an object is moving and, if so, along what trajectory. For instance, after a given object is recognized, a perception engine 238 may detect how the given object moves in relation to the vehicle. Such functionality may be used, for instance, to detect objects, such as other vehicles, pedestrians, wildlife, cyclists, etc. moving within an environment, which may affect the path of the vehicle on a roadway, among other example uses.

A localization engine 240 may also be included within an autonomous driving system 210 in some implementation. In some cases, localization engine 240 may be implemented as a sub-component of a perception engine 238. The localization engine 240 may also make use of one or more machine learning models 256 and sensor fusion (e.g., of LIDAR and GPS data, etc.) to determine a high confidence location of the vehicle and the space it occupies within a given physical space (or "environment").

A vehicle 105 may further include a path planner 242, which may make use of the results of various other modules, such as data collection (e.g., 234), sensor fusion (e.g., 236), perception engine (e.g., 238), and localization engine (e.g., 240) among others (e.g., recommendation engine 244) to determine a path plan and/or action plan for the vehicle, which may be used by drive controls (e.g., 220) to control the driving of the vehicle 105 within an environment. For instance, a path planner 242 may utilize these inputs and one or more machine learning models to determine probabilities of various events within a driving environment to determine effective real-time plans to act within the environment.

In some implementations, the vehicle 105 may include one or more recommendation engines 244 to generate various recommendations from sensor data generated by the vehicle's 105 own sensors (e.g., 225) as well as sensor data from extraneous sensors (e.g., on sensor devices 115, 180, 215, etc.). Some recommendations may be determined by the recommendation engine 244, which may be provided as inputs to other components of the vehicle's autonomous driving stack to influence determinations that are made by these components. For instance, a recommendation may be determined, which, when considered by a path planner 242, causes the path planner 242 to deviate from decisions or plans it would ordinarily otherwise determine, but for the recommendation. Recommendations may also be generated by recommendation engines (e.g., 244) based on considerations of passenger comfort and experience. In some cases, interior features within the vehicle may be manipulated predictively and autonomously based on these recommendations (which are determined from sensor data (e.g., 258) captured by the vehicle's sensors and/or extraneous sensors, etc.

As introduced above, some vehicle implementations may include user/passenger experience engines (e.g., 246), which may utilize sensor data and outputs of other modules within the vehicle's autonomous driving stack to cause driving maneuvers and changes to the vehicle's cabin environment to enhance the experience of passengers within the vehicle based on the observations captured by the sensor data (e.g., 258). In some instances, aspects of user interfaces (e.g., 230) provided on the vehicle to enable users to interact with the vehicle and its autonomous driving system may be enhanced. In some cases, informational presentations may be generated and provided through user displays (e.g., audio, visual, and/or tactile presentations) to help affect and improve passenger experiences within a vehicle (e.g., 105) among other example uses.

In some cases, a system manager 250 may also be provided, which monitors information collected by various sensors on the vehicle to detect issues relating to the performance of a vehicle's autonomous driving system. For instance, computational errors, sensor outages and issues, availability and quality of communication channels (e.g., provided through communication modules 212), vehicle system checks (e.g., issues relating to the motor, transmission, battery, cooling system, electrical system, tires, etc.), or other operational events may be detected by the system manager 250. Such issues may be identified in system report data generated by the system manager 250, which may be utilized, in some cases as inputs to machine learning models 256 and related autonomous driving modules (e.g., 232, 234, 236, 238, 240, 242, 244, 246, etc.) to enable vehicle system health and issues to also be considered along with other information collected in sensor data 258 in the autonomous driving functionality of the vehicle 105.

In some implementations, an autonomous driving stack of a vehicle 105 may be coupled with drive controls 220 to affect how the vehicle is driven, including steering controls (e.g., 260), accelerator/throttle controls (e.g., 262), braking controls (e.g., 264), signaling controls (e.g., 266), among other examples. In some cases, a vehicle may also be controlled wholly or partially based on user inputs. For instance, user interfaces (e.g., 230), may include driving controls (e.g., a physical or virtual steering wheel, accelerator, brakes, clutch, etc.) to allow a human driver to take control from the autonomous driving system (e.g., in a handover or following a driver assist action). Other sensors may be utilized to accept user/passenger inputs, such as speech detection 292, gesture detection cameras 294, and other examples. User interfaces (e.g., 230) may capture the desires and intentions of the passenger-users and the autonomous driving stack of the vehicle 105 may consider these as additional inputs in controlling the driving of the vehicle (e.g., drive controls 220). In some implementations, drive controls may be governed by external computing systems, such as in cases where a passenger utilizes an external device (e.g., a smartphone or tablet) to provide driving direction or control, or in cases of a remote valet service, where an external driver or system takes over control of the vehicle (e.g., based on an emergency event), among other example implementations.

As discussed above, the autonomous driving stack of a vehicle may utilize a variety of sensor data (e.g., 258) generated by various sensors provided on and external to the vehicle. As an example, a vehicle 105 may possess an array of sensors 225 to collect various information relating to the exterior of the vehicle and the surrounding environment, vehicle system status, conditions within the vehicle, and other information usable by the modules of the vehicle's processing system 210. For instance, such sensors 225 may include global positioning (GPS) sensors 268, light detection and ranging (LIDAR) sensors 270, two-dimensional (2D) cameras 272, three-dimensional (3D) or stereo cameras 274, acoustic sensors 276, inertial measurement unit (IMU) sensors 278, thermal sensors 280, ultrasound sensors 282, bio sensors 284 (e.g., facial recognition, voice recognition, heart rate sensors, body temperature sensors, emotion detection sensors, etc.), radar sensors 286, weather sensors (not shown), among other example sensors. Sensor data 258 may also (or instead) be generated by sensors that are not integrally coupled to the vehicle, including sensors on other vehicles (e.g., 115) (which may be communicated to the vehicle 105 through vehicle-to-vehicle communications or other techniques), sensors on ground-based or aerial drones 180, sensors of user devices 215 (e.g., a smartphone or wearable) carried by human users inside or outside the vehicle 105, and sensors mounted or provided with other roadside elements, such as a roadside unit (e.g., 140), road sign, traffic light, streetlight, etc. Sensor data from such extraneous sensor devices may be provided directly from the sensor devices to the vehicle or may be provided through data aggregation devices or as results generated based on these sensors by other computing systems (e.g., 140, 150), among other example implementations.

In some implementations, an autonomous vehicle system 105 may interface with and leverage information and services provided by other computing systems to enhance, enable, or otherwise support the autonomous driving functionality of the device 105. In some instances, some autonomous driving features (including some of the example solutions discussed herein) may be enabled through services, computing logic, machine learning models, data, or other resources of computing systems external to a vehicle. When such external systems are unavailable to a vehicle, it may be that these features are at least temporarily disabled. For instance, external computing systems may be provided and leveraged, which are hosted in road-side units or fog-based edge devices (e.g., 140), other (e.g., higher-level) vehicles (e.g., 115), and cloud-based systems 150 (e.g., accessible through various network access points (e.g., 145)). A roadside unit 140 or cloud-based system 150 (or other cooperating system, with which a vehicle (e.g., 105) interacts may include all or a portion of the logic illustrated as belonging to an example autonomous driving system (e.g., 210), along with potentially additional functionality and logic. For instance, a cloud-based computing system, road-side unit 140, or other computing system may include a machine learning engine supporting either or both model training and inference engine logic. For instance, such external systems may possess higher-end computing resources and more developed or up-to-date machine learning models, allowing these services to provide superior results to what would be generated natively on a vehicle's processing system 210. For instance, an autonomous driving system 210 may rely on the machine learning training, machine learning inference, and/or machine learning models provided through a cloud-based service for certain tasks and handling certain scenarios. Indeed, it should be appreciated that one or more of the modules discussed and illustrated as belonging to vehicle 105 may, in some implementations, be alternatively or redundantly provided within a cloud-based, fog-based, or other computing system supporting an autonomous driving environment.

Various embodiments herein may utilize one or more machine learning models to perform functions of the AV stack (or other functions described herein). A machine learning model may be executed by a computing system to progressively improve performance of a specific task. In some embodiments, parameters of a machine learning model may be adjusted during a training phase based on training data. A trained machine learning model may then be used during an inference phase to make predictions or decisions based on input data.

The machine learning models described herein may take any suitable form or utilize any suitable techniques. For example, any of the machine learning models may utilize supervised learning, semi-supervised learning, unsupervised learning, or reinforcement learning techniques.

In supervised learning, the model may be built using a training set of data that contains both the inputs and corresponding desired outputs. Each training instance may include one or more inputs and a desired output. Training may include iterating through training instances and using an objective function to teach the model to predict the output for new inputs. In semi-supervised learning, a portion of the inputs in the training set may be missing the desired outputs.

In unsupervised learning, the model may be built from a set of data which contains only inputs and no desired outputs. The unsupervised model may be used to find structure in the data (e.g., grouping or clustering of data points) by discovering patterns in the data. Techniques that may be implemented in an unsupervised learning model include, e.g., self-organizing maps, nearest-neighbor mapping, k-means clustering, and singular value decomposition.

Reinforcement learning models may be given positive or negative feedback to improve accuracy. A reinforcement learning model may attempt to maximize one or more objectives/rewards. Techniques that may be implemented in a reinforcement learning model may include, e.g., Q-learning, temporal difference (TD), and deep adversarial networks.

Various embodiments described herein may utilize one or more classification models. In a classification model, the outputs may be restricted to a limited set of values. The classification model may output a class for an input set of one or more input values. References herein to classification models may contemplate a model that implements, e.g., any one or more of the following techniques: linear classifiers (e.g., logistic regression or naïve Bayes classifier), support vector machines, decision trees, boosted trees, random forest, neural networks, or nearest neighbor.

Various embodiments described herein may utilize one or more regression models. A regression model may output a numerical value from a continuous range based on an input set of one or more values. References herein to regression models may contemplate a model that implements, e.g., any one or more of the following techniques (or other suitable techniques): linear regression, decision trees, random forest, or neural networks.

In various embodiments, any of the machine learning models discussed herein may utilize one or more neural networks. A neural network may include a group of neural units loosely modeled after the structure of a biological brain which includes large clusters of neurons connected by synapses. In a neural network, neural units are connected to other neural units via links which may be excitatory or inhibitory in their effect on the activation state of connected neural units. A neural unit may perform a function utilizing the values of its inputs to update a membrane potential of the neural unit. A neural unit may propagate a spike signal to connected neural units when a threshold associated with the neural unit is surpassed. A neural network may be trained or otherwise adapted to perform various data processing tasks (including tasks performed by the AV stack), such as computer vision tasks, speech recognition tasks, or other suitable computing tasks.

Figure 3:
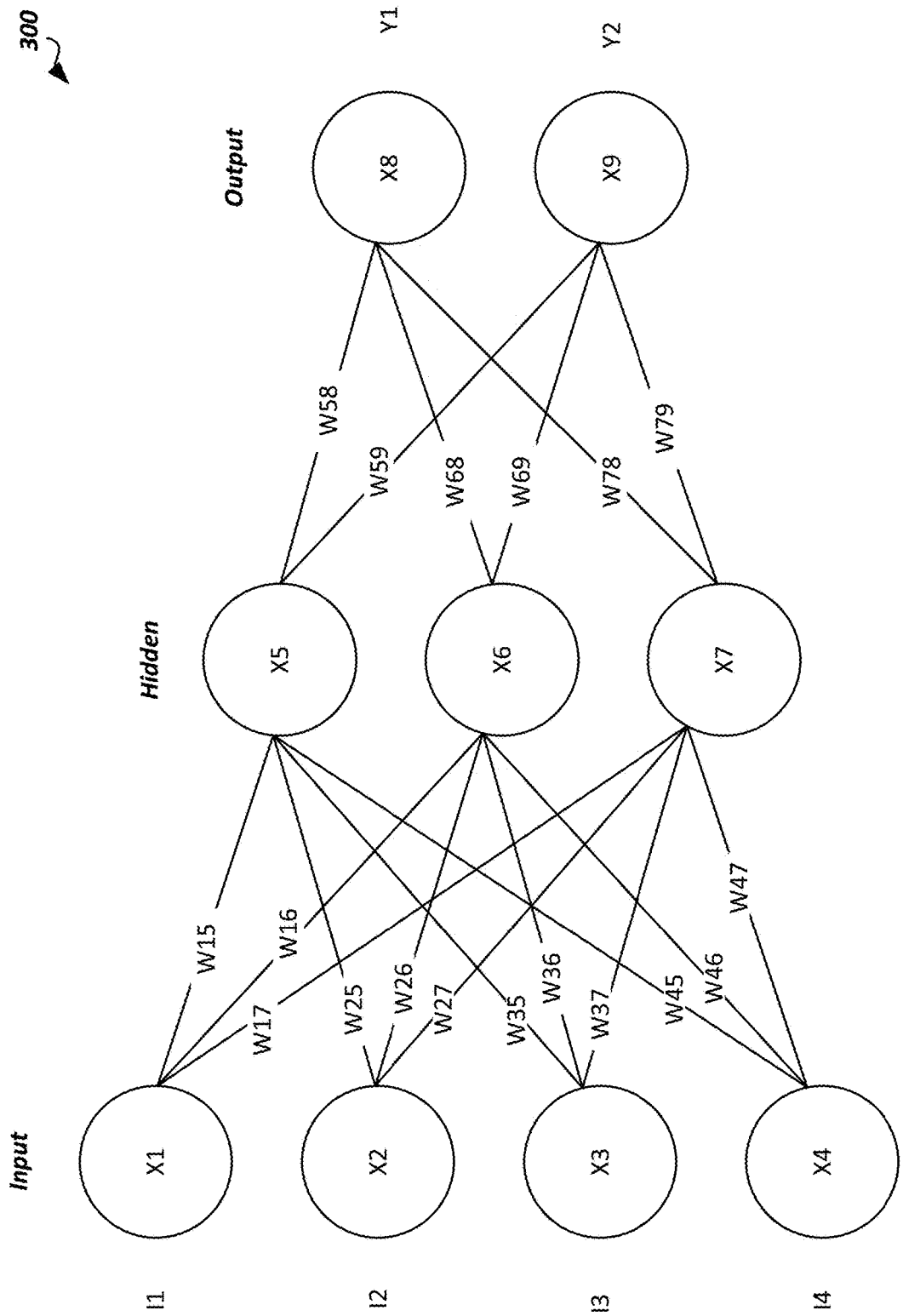
FIG. 3 illustrates an example portion of a neural network in accordance with certain embodiments.

FIG. 3 illustrates an example portion of a neural network 300 in accordance with certain embodiments. The neural network 300 includes neural units X1-X9. Neural units X1-X4 are input neural units that respectively receive primary inputs 11-14 (which may be held constant while the neural network 300 processes an output). Any suitable primary inputs may be used. As one example, when neural network 300 performs image processing, a primary input value may be the value of a pixel from an image (and the value of the primary input may stay constant while the image is processed). As another example, when neural network 300 performs speech processing the primary input value applied to a particular input neural unit may change over time based on changes to the input speech.

While a specific topology and connectivity scheme is shown in FIG. 3, the teachings of the present disclosure may be used in neural networks having any suitable topology and/or connectivity. For example, a neural network may be a feedforward neural network, a recurrent network, or other neural network with any suitable connectivity between neural units. As another example, although the neural network is depicted as having an input layer, a hidden layer, and an output layer, a neural network may have any suitable layers arranged in any suitable fashion In the embodiment depicted, each link between two neural units has a synapse weight indicating the strength of the relationship between the two neural units. The synapse weights are depicted as WXY, where X indicates the pre-synaptic neural unit and Y indicates the post-synaptic neural unit. Links between the neural units may be excitatory or inhibitory in their effect on the activation state of connected neural units. For example, a spike that propagates from X1 to X5 may increase or decrease the membrane potential of X5 depending on the value of W15. In various embodiments, the connections may be directed or undirected.

In various embodiments, during each time-step of a neural network, a neural unit may receive any suitable inputs, such as a bias value or one or more input spikes from one or more of the neural units that are connected via respective synapses to the neural unit (this set of neural units are referred to as fan-in neural units of the neural unit). The bias value applied to a neural unit may be a function of a primary input applied to an input neural unit and/or some other value applied to a neural unit (e.g., a constant value that may be adjusted during training or other operation of the neural network). In various embodiments, each neural unit may be associated with its own bias value or a bias value could be applied to multiple neural units.

The neural unit may perform a function utilizing the values of its inputs and its current membrane potential. For example, the inputs may be added to the current membrane potential of the neural unit to generate an updated membrane potential. As another example, a non-linear function, such as a sigmoid transfer function, may be applied to the inputs and the current membrane potential. Any other suitable function may be used. The neural unit then updates its membrane potential based on the output of the function.

Figure 4:
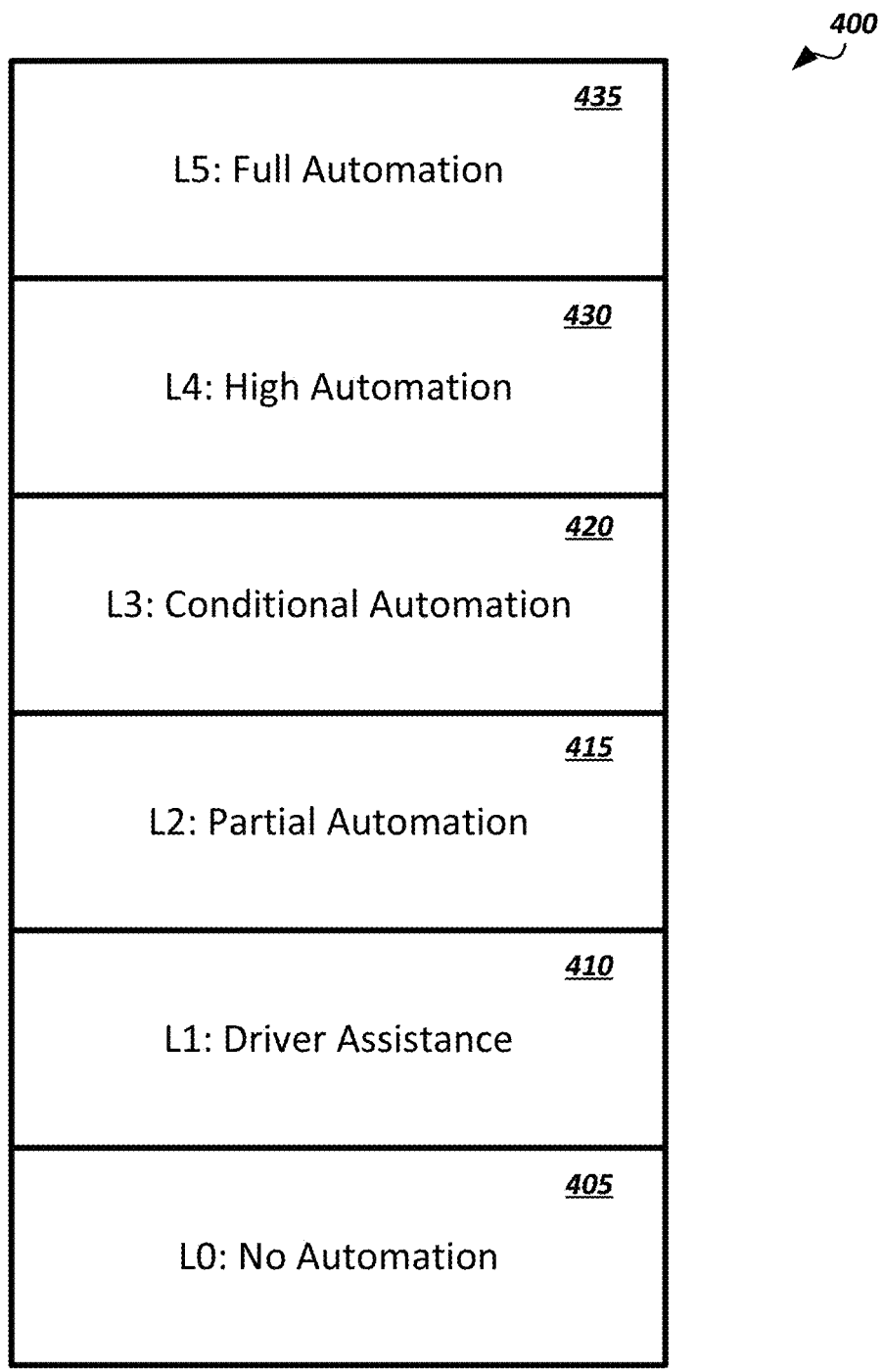
FIG. 4 is a simplified block diagram illustrating example levels of autonomous driving, which may be supported in various vehicles.

Turning to FIG. 4, a simplified block diagram 400 is shown illustrating example levels of autonomous driving, which may be supported in various vehicles (e.g., by their corresponding in-vehicle computing systems. For instance, a range of levels may be defined (e.g., L0-L5 (405-435)), with level 5 (L5) corresponding to vehicles with the highest level of autonomous driving functionality (e.g., full automation), and level 0 (L0) corresponding the lowest level of autonomous driving functionality (e.g., no automation). For instance, an L5 vehicle (e.g., 435) may possess a fully autonomous computing system capable of providing autonomous driving performance in every driving scenario equal to or better than would be provided by a human driver, including in extreme road conditions and weather. An L4 vehicle (e.g., 430) may also be considered fully autonomous and capable of autonomously performing safety-critical driving functions and effectively monitoring roadway conditions throughout an entire trip from a starting location to a destination. L4 vehicles may differ from L5 vehicles, in that an L4's autonomous capabilities are defined within the limits of the vehicle's "operational design domain," which may not include all driving scenarios. L3 vehicles (e.g., 420) provide autonomous driving functionality to completely shift safety-critical functions to the vehicle in a set of specific traffic and environment conditions, but which still expect the engagement and availability of human drivers to handle driving in all other scenarios. Accordingly, L3 vehicles may provide handover protocols to orchestrate the transfer of control from a human driver to the autonomous driving stack and back. L2 vehicles (e.g., 415) provide driver assistance functionality, which allow the driver to occasionally disengage from physically operating the vehicle, such that both the hands and feet of the driver may disengage periodically from the physical controls of the vehicle. L1 vehicles (e.g., 410) provide driver assistance of one or more specific functions (e.g., steering, braking, etc.), but still require constant driver control of most functions of the vehicle. L0 vehicles may be considered not autonomous—the human driver controls all of the driving functionality of the vehicle (although such vehicles may nonetheless participate passively within autonomous driving environments, such as by providing sensor data to higher level vehicles, using sensor data to enhance GPS and infotainment services within the vehicle, etc.). In some implementations, a single vehicle may support operation at multiple autonomous driving levels. For instance, a driver may control and select which supported level of autonomy is used during a given trip (e.g., L4 or a lower level). In other cases, a vehicle may autonomously toggle between levels, for instance, based on conditions affecting the roadway or the vehicle's autonomous driving system. For example, in response to detecting that one or more sensors have been compromised, an L5 or L4 vehicle may shift to a lower mode (e.g., L2 or lower) to involve a human passenger in light of the sensor issue, among other examples.

Figure 5:
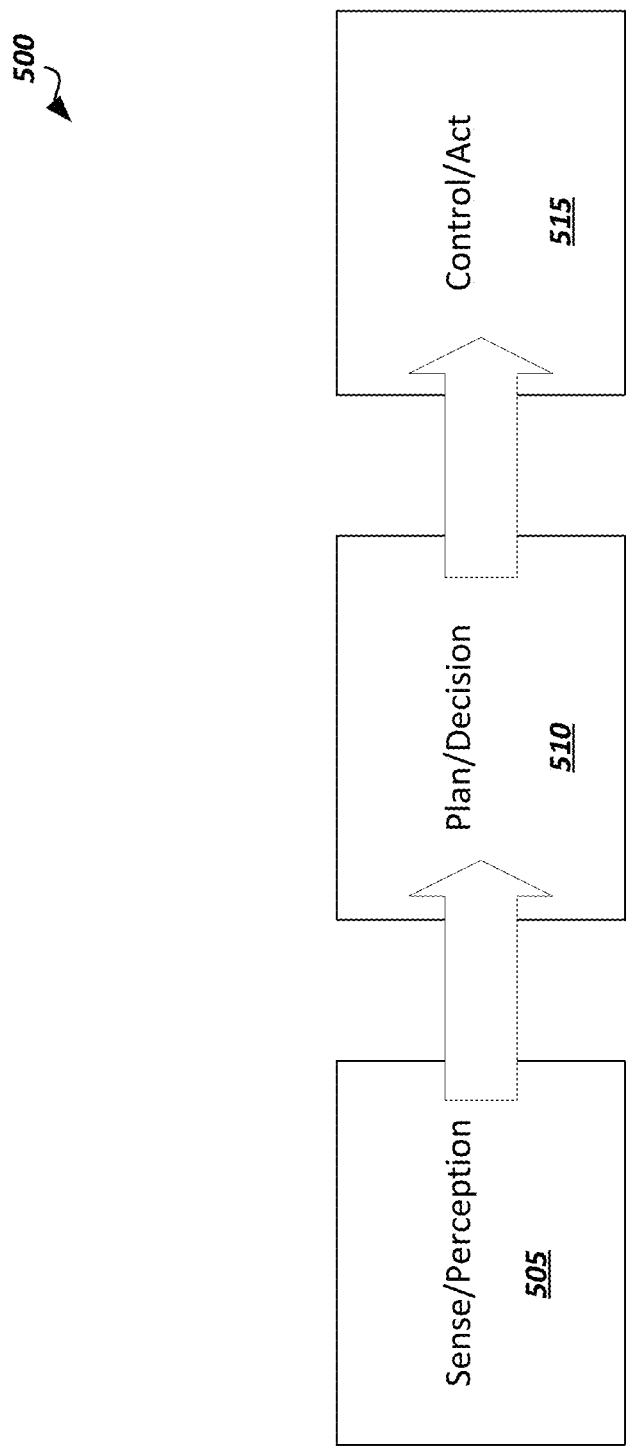
FIG. 5 is a simplified block diagram illustrating an example autonomous driving flow which may be implemented in some autonomous driving systems.

FIG. 5 is a simplified block diagram 500 illustrating an example autonomous driving flow which may be implemented in some autonomous driving systems. For instance, an autonomous driving flow implemented in an autonomous (or semi-autonomous) vehicle may include a sensing and perception stage 505, a planning and decision stage 510, and a control and action phase 515. During a sensing and perception stage 505 data is generated by various sensors and collected for use by the autonomous driving system. Data collection, in some instances, may include data filtering and receiving sensor from external sources. This stage may also include sensor fusion operations and object recognition and other perception tasks, such as localization, performed using one or more machine learning models. A planning and decision stage 510 may utilize the sensor data and results of various perception operations to make probabilistic predictions of the roadway(s) ahead and determine a real time path plan based on these predictions. A planning and decision stage 510 may additionally include making decisions relating to the path plan in reaction to the detection of obstacles and other events to decide on whether and what action to take to safely navigate the determined path in light of these events. Based on the path plan and decisions of the planning and decision stage 510, a control and action stage 515 may convert these determinations into actions, through actuators to manipulate driving controls including steering, acceleration, and braking, as well as secondary controls, such as turn signals, sensor cleaners, windshield wipers, headlights, etc.

Current vehicle safety systems are passive in nature; that is, they operate in response to a collision occurring, regardless of the angle, direction, or force of the impact. For instance, current vehicle safety systems may include passive mechanisms such as fixed location airbags with programmed inflation rates and fixed impact sensors which actuate based on programmed acceleration rates. These items might not be aware of the prior state of the car before impact or what the vehicle will do during impact, which may impact passenger safety and deployment of internal safety devices. Passenger safety may accordingly vary depending on the direction or force of impact, position of the passengers, and the object that the vehicle is impacting, since not all points of a vehicle are homogeneous with respect to their safety and structural integrity (i.e., some points of the vehicle may be weaker, requiring additional protection than other areas).

Where a human driver is in command of a vehicle, little can be done in the event of a collision because of the nature of driving and the capacities of human drivers to plan and execute emergency maneuvers. However, in a world with autonomous (e.g., AI-based) systems and powerful sensor networks, it should be possible for many scenarios to be calculated and pre-staged in anticipation of a collision. For example, an autonomous system may determine and optimize a collision (e.g., by controlling vehicle positioning in advance of the collision) to minimize damage and injury to passengers or others, taking maximum advantage of passive and active safety systems and optimizing their use and execution. In addition, because current automotive systems are not connected to or in communication with other vehicles or roadside objects/structures, there is no proactive means for imminently colliding vehicles (or vehicles and structures) to communicate with each other and determine potential strategies that may mitigate damage, injury, or death.

Accordingly, the present disclosure describes embodiments of a proactive vehicle safety system that may optimize a collision outcome, e.g., through proactive vehicle path planning, vehicle and/or passenger positioning, smart control of passive safety mechanisms, etc. The techniques described herein may be applied to an existing automobile where actuators (e.g., steering, brakes, throttle) can override driver inputs, and may also be applied to an autonomous vehicle (AV) where a proactive safety system operates in parallel with another high-performance computer system (e.g., an AI-based system) focused on identifying safest, minimal loss/damage strategies for that vehicle in case of an imminent accident. Various modalities may be supported by the techniques described herein.

For instance, a single vehicle loss minimization modality may be utilized, that includes active impact direction prediction, active vehicle and/or passenger orientation, and variable reaction response techniques for passive safety mechanisms. For example, the vehicle may use active sensors and deep learning identification and tracking technology to identify critical objects in the collision zone, plot the potential accident trajectory, and actively orient the vehicle to present the "safest" impact surface of the vehicle using vehicle actuators to maneuver the vehicle. In addition, the vehicle may present the strongest passenger restraint and safety systems to the accident direction. This can include rotation of the vehicle or rotation of the internal seats (or cabin) directions to present the safest angle prior to impact (e.g., ensure passengers are directed with their backs to the accident and impact strikes an open seat vs an occupied one).

Further, predictive systems can initiate and control activation of the passive vehicle safety mechanisms, such as by pre-deploying air bags or other protective restraints and intrusion systems (e.g., roll bars or a passenger protection cage) prior to the impact. In some cases, the proactive system may adjust the response of the passive mechanisms, such as air bag inflation rates or multiple air bag deployment (e.g., to minimize whiplash of the passenger's limbs, neck, and head). In comparison, today's systems typically use a blank ammo round to deploy airbags, providing an all-or-nothing option, and are discharged in response to an impact through a passive sensor with no safety interconnect to other systems to optimize the overall safety by coordinating the various passive mechanisms with the active ones. By controlling these systems together, impact G's and shock to internal organs through active dampening of the impact may be achieved. For example, an air bag system with variable inflation rates or timed inflation patterns (e.g., to open early to provide partial deflation at impact) may reduce injury to the passenger (especially in the case of children or small animals).

Figure 6:
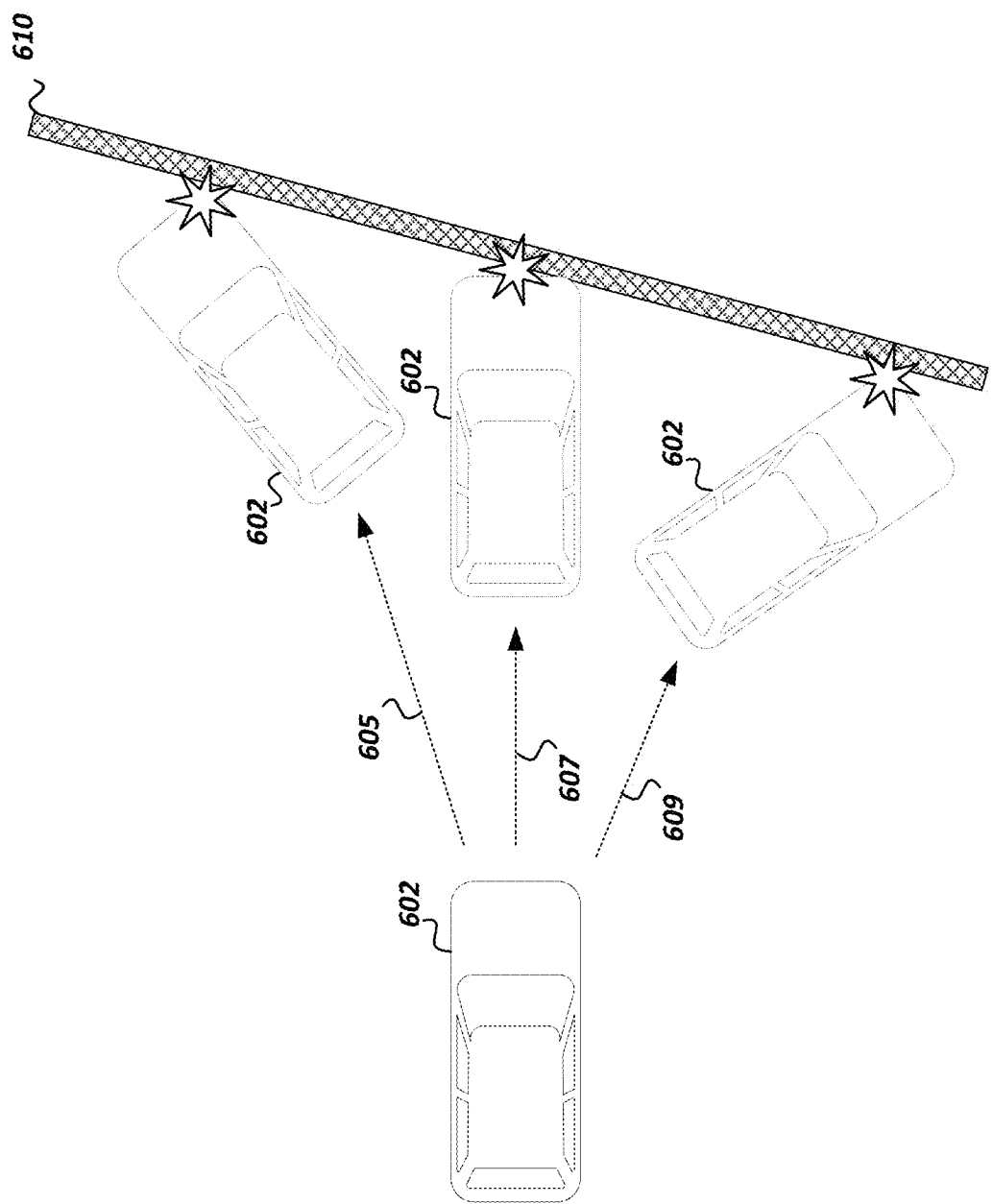
FIG. 6 is a diagram showing an example scenario for determining an optimal path and orientation for an imminent collision between a vehicle and an object.

For instance, referring to the scenarios shown in FIGS. 6-7, vehicle 602 is heading toward object 610 and a collision between the two is imminent, as there is no time or space for the vehicle 602 to avoid the collision (e.g., due to vehicle capabilities, vehicle speed, etc.). Assuming no driver input (e.g., where the driver has become distracted or disabled, or is otherwise no longer controlling the vehicle), the vehicle will continue along path 607 and hit the object 610 in a near head-on collision, which may be quite dangerous. However, according to aspects of the present disclosure, a proactive safety system of the vehicle 602 may determine (e.g., based on safety information for the vehicle (e.g., crumple zones, crash test data, etc.), information about the passengers (e.g., age, size, location in the vehicle), or other information about the vehicle (e.g., un-restrained objects inside the vehicle, which may become projectile threats in an accident)) a collision orientation for the vehicle and its passengers that optimizes a safety outcome for the collision, and may autonomously control the vehicle to achieve the optimal collision orientations for the vehicle and its passengers).

Figure 7A:
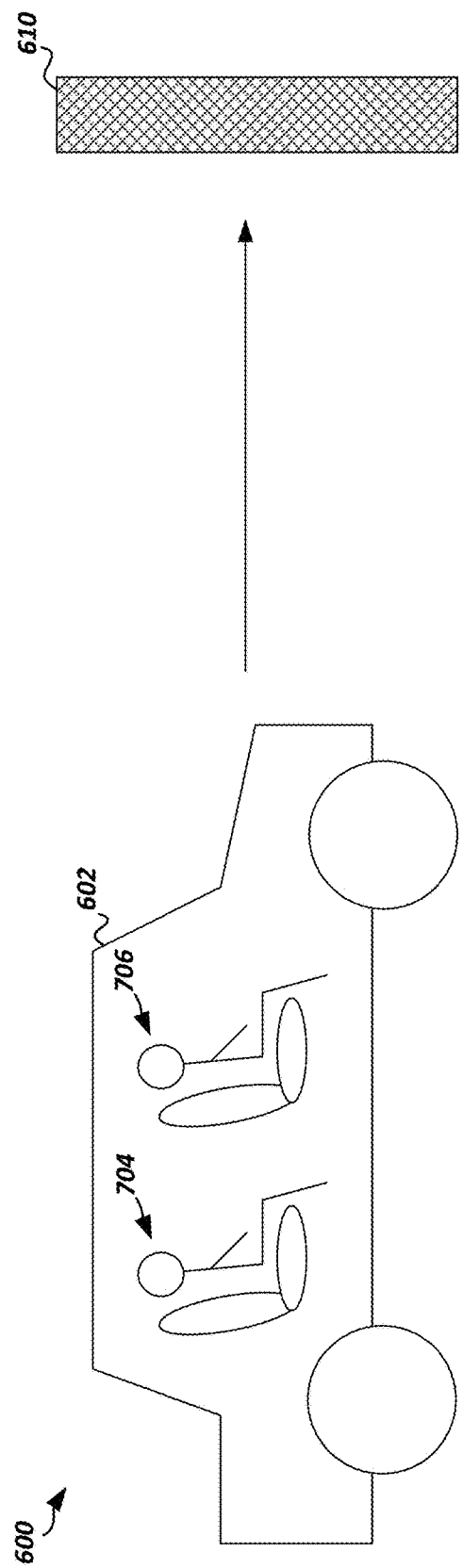
FIGS. 7A-7B are diagrams showing an example scenario for determining an optimal passenger orientation for an imminent collision between a vehicle and an object.
Figure 7B:
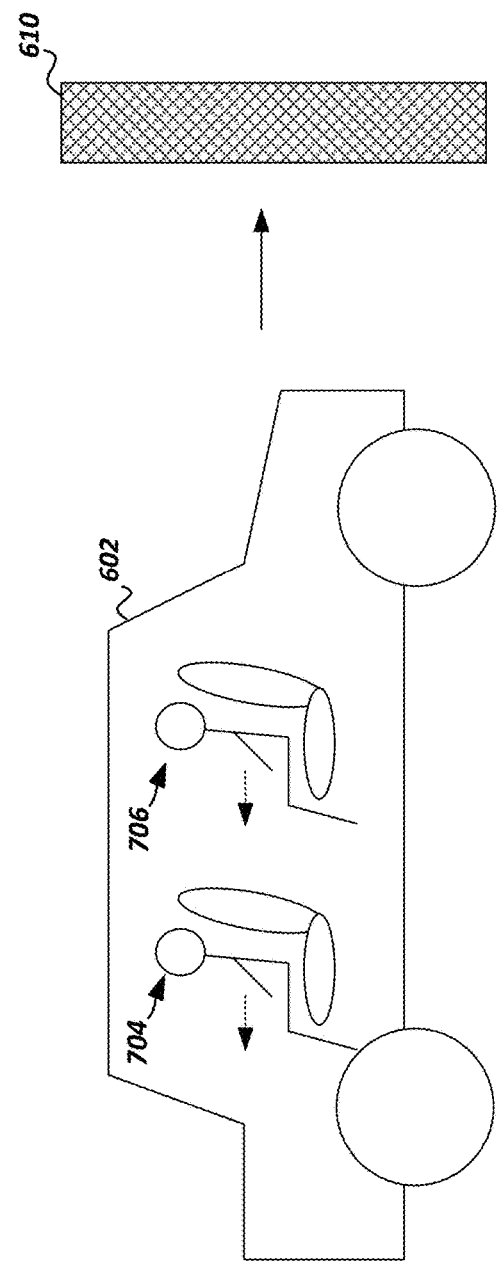

For instance, referring to the example shown in FIG. 6, the vehicle 602 may choose path 605 over paths 607, 609, or other potential paths because path 605 is determined to produce the safest outcome for the imminent collision. The path 605 may have been chosen over the other paths, for example, based on a determination that the glancing nature of the impact for path 605 will increase safety (e.g., over path 607), the location of the impact on the vehicle for path 605 will increase safety (e.g., over path 607 due to a crumple zone in that region of the vehicle), the location of the passengers in the vehicle dictates that path 605 is safer (e.g., where there is only a driver in the vehicle, and the side of the vehicle presented for impact is the passenger side (vs. path 609 for example)), or for other reasons. Although illustrated as changing the path of the vehicle 602, it will be understood that the vehicle may alternatively, in some instances, determine to continue on path 607 and yaw or pivot to present a safest angle for the collision with the object 610. In addition, as shown in FIGS. 7A-7B, the vehicle 602 may reorient the passengers 704, 706 of the vehicle to present their backs to the direction of impact with the object 610 and move their seats further away from the point of impact to increase their safety. In some cases, the system may be programmed to identify child/baby seats in the vehicle and optimize the accident impact angle and direction so that the child (or an older person) is afforded the maximum protection by the vehicle itself and its internal safety systems.

In some cases, multiple vehicles may communicate with one another to coordinate safety in response to a determination of an imminent collision. For example, in the event of an emergency or imminent crash, a vehicle in trouble may communicate with one or more vehicles in its vicinity (e.g., in its current path or potential future paths), such as those on a converging vector. The vehicles may share their safest points of impact with one another and may determine impact trajectories so that the vehicle(s) collide in the safest locations. For example, a collaborative safety operation may include one vehicle opening an escape space/lane for a runaway vehicle or truck to move out of lanes of traffic and onto the shoulder of the road.

In addition, the vehicles may determine impact trajectories that will allow the vehicles to come to rest in a "safe" location away from pedestrians or other potential hazards and with minimum injury to occupants. In some models, multiple vehicles may interact to slow a fast-moving, out of control vehicle by deflecting that moving vehicle to adjust its trajectory or reduce its speed through oblique impact and bring it to rest in a safe location. In this scenario, one might avoid major highway pileups by having vehicles contain the potential accident to one lane and avoiding rollovers, for example.

Figure 8:
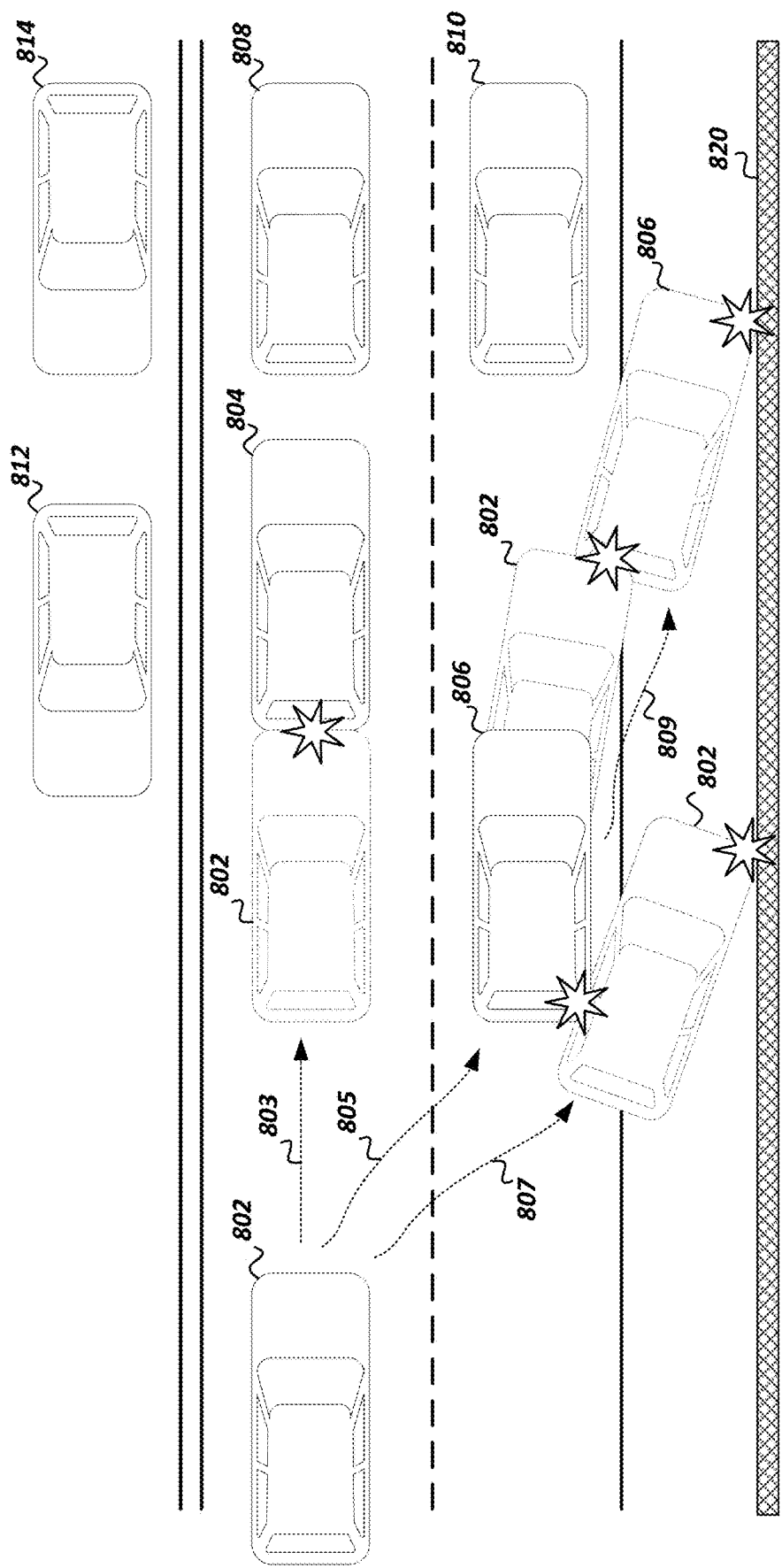
FIG. 8 is a diagram showing an example scenario for determining an optimal path and orientation based on communication between vehicles.

For instance, referring to the example scenario shown in FIG. 8, vehicle 802 has determined that a collision is imminent with at least one other vehicle or object in the environment, as there is no time or space for the vehicle 802 to avoid a collision (e.g., based on its speed, current path, distance to objects, capabilities, etc.). Assuming no driver input for vehicle 802 or other vehicles (e.g., where the driver of vehicle 802 has become distracted or disabled, or is otherwise no longer controlling the vehicle 802), the vehicle 802 will continue along path 803 and hit the vehicle 804 in front of it in a near head-on collision, which may be quite dangerous and may cause additional collisions (e.g., with one or more of vehicles 808, 810, 812, 814). However, according to aspects of the present disclosure, a proactive safety system of the vehicle 802 may determine (e.g., based on safety information for the vehicle 802 (e.g., crumple zones, crash test data, etc.), information from other vehicles regarding their safety, trajectory, etc., or other information) an optimal collision orientation and path to achieve the safest collision outcome possible.

The optimal orientation and path determination may be based on information received by the vehicle 802 from other vehicles (e.g., 804, 806) regarding their respective paths, safety information, etc. In some cases, the vehicles may coordinate paths to achieve a safest overall collision outcome. For example, the vehicles 802, 806 may exchange information with one another and coordinate paths. For instance, in one scenario, the vehicle 802 may choose to continue along path 805 while vehicle 806 may choose to continue along path 809 so that both vehicles' speeds are reduced as much as possible before hitting anything (e.g., vehicle 806 hitting wall 820). In another scenario, the vehicle 802 may choose to continue along path 807 while the vehicle 806 slows, causing a slight collision with vehicle 802 to help direct the vehicle 802 toward the wall 820 and reduce its speed before impact. The vehicles 802, 806 may choose one of these two scenarios because they will be the only two vehicles involved in the collision (rather than additional vehicles, such as 804, 808, 810, etc.).

In some cases, vehicles may obtain information from roadside objects or structures (e.g., through signage, or communication with the object/structure) and use that information in determining an optimal path and collision orientation. For example, in a vehicle-to-everything (V2X) model, a building's exterior walls could communicate to a runaway vehicle the "safest" zone of the building for the vehicle to strike and minimize injuries to people (inside the vehicle, the building, or both). In some instances, certain sections of buildings may be constructed to have (or may have adjacent structures with) areas intentionally designed to sustain crashes. In passive models, the structure may simply have a visible marker that is used to indicate these "crash zones" to the vehicle's safety system, while in active models there could be a transponder on the structure to communicate with the vehicle's safety system. Further, in some instances, the vehicle may use information about the building itself (e.g., placement of windows vs. brick walls) to make decisions related to path/orientation. For example, a vehicle may decide to avoid glass windows of buildings, which may increase the chance of injury to people within the building.

Figure 9:
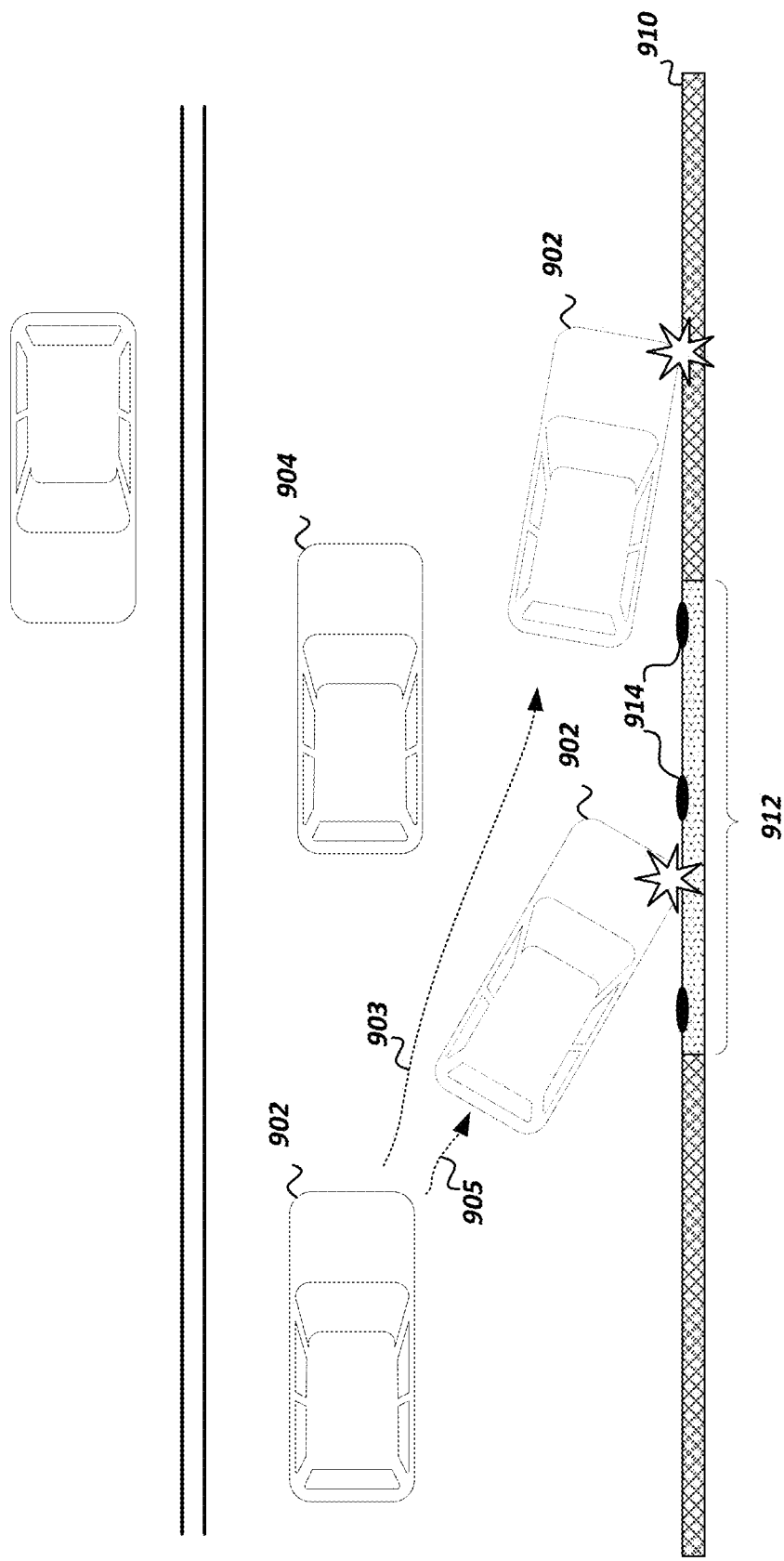
FIG. 9 is a diagram showing an example scenario for determining an optimal path and orientation based on communication between a vehicle and an object.

For instance, referring to the example scenario shown in FIG. 9, vehicle 902 has determined that a collision is imminent with either vehicle 904 or structure 910, as there is no time or space for the vehicle 902 to avoid a collision (e.g., based on its speed, current path, distance to objects, capabilities, etc.). According to aspects of the present disclosure, a proactive safety system of the vehicle 902 may determine (e.g., based on safety information for the vehicle 902 (e.g., crumple zones, crash test data, etc.) and information from the structure 910 regarding its safety (e.g., construction, building occupancy information, "crash zones", etc.) an optimal collision orientation and path to achieve the safest collision outcome possible. For example, the vehicle may choose between paths 903 and 905 to avoid a collision with vehicle 904, ensuring a collision with the structure 910. The vehicle may receive information from the structure 910 (e.g., via markings 914 or a transponder connected to the structure 910) that the structure 910 has a particular area 914 that would create a safest outcome for occupants of the building. This zone may be safest because it is constructed to be a safe crash zone (that is, has been designed to handle impacts from vehicles better than other areas of the structure 910), has the fewest occupants nearby, or for another reason. Based on this information, the vehicle 910 may choose path 903 or 905 (or another path) as the safest collision path. For instance, path 903 may be chosen if it is determined to be safer than path 905 (e.g., due to a more glancing blow with the structure), while path 905 may be chosen if it is determined to be safer than path 903 (e.g., due to the enhanced safety allowed by the crash zone 912).

In certain implementations, a trained neural network model of the vehicle dynamics and safety systems may be used to optimize a vehicle's safety characteristics in the event of an accident. For instance, a vehicle may be provided with an initially trained model specific to the vehicle. Over time, that model may be re-trained or learn based on service information or other historical information from the vehicle itself, in effect customizing the model to that particular vehicle and its actual expected performance and capabilities (compared with the factory expected specifications). In addition, in some implementations, a neural network may be used as an actuation system to control (e.g., time) the release of passive safety restraint devices in the vehicle. Further, in some implementations, real accident data may be used to improve the characteristics of vehicles, while on the road, when confronted with an imminent accident situation. For instance, deep learning models may be used to comprehend an imminent accident, determine it is unavoidable, and take steps to preset and modulate the passenger safety systems, presenting a significant enhancement to current vehicle safety systems.

For instance, a neural network enhanced safety system described herein may continuously track a vehicle's autonomous control system (or "ADAS") with respect to the car and potential impacts, may constantly identify potential scenarios as most probable incidents, and may calculate safety responses in the form of recommendations to the vehicle's ADAS on trajectories with minimum damage primary and secondary impact characteristics. In addition, the safety neural network (S-NN) may use the information on vehicle safety characteristics in its own models to plan potential safety responses to an imminent accident. In other words, if the S-NN receives an alert from the vehicle's ADAS that control is lost and an accident is impending, the S-NN can predictively preset the active and passive safety mechanisms to minimize injury and loss of life. In addition, since the S-NN may have been providing ADAS with information on optimizing the impact orientation of the vehicle, the ADAS may have had time to orient the car to an object (like a lamp post vs a school bus of children) so that the part of the car best designed to take the impact does take the impact. This also optimizes the effectiveness of any passive device or mechanism, like air bags, which are intended to provide maximum protection under specific car orientations and strike angles. Finally, in connected environments, our system can cross-communicate its strategy to other vehicles to allow them to optimize their safety and impact strategy for an incoming vehicle accident.

Aspects of the present disclosure may provide one or more advantages. For instance, in some cases, the techniques described herein may convert a current passive safety system into an active and, potentially, proactive one. In addition, the techniques described herein would not negate the operation of fail-safe modes based on existing technologies. In certain instances, a proactive vehicle system as described herein may help decrease the concern of most consumers to autonomous vehicle accidents by providing enhanced safety in case of an accident. Consequently, the position of lower accidents and reduced injury in autonomous vehicles is further enhanced by a system which places the occupants in the safest scenario possible in case of any accident. Moreover, systems proposed herein may be capable of learning from actual accidents through the retraining of a safety neural network (S-NN) system of an autonomous vehicle and models from actual accident data, so known accident data can be used to reinforce or modify safety behavior.

Figure 10:
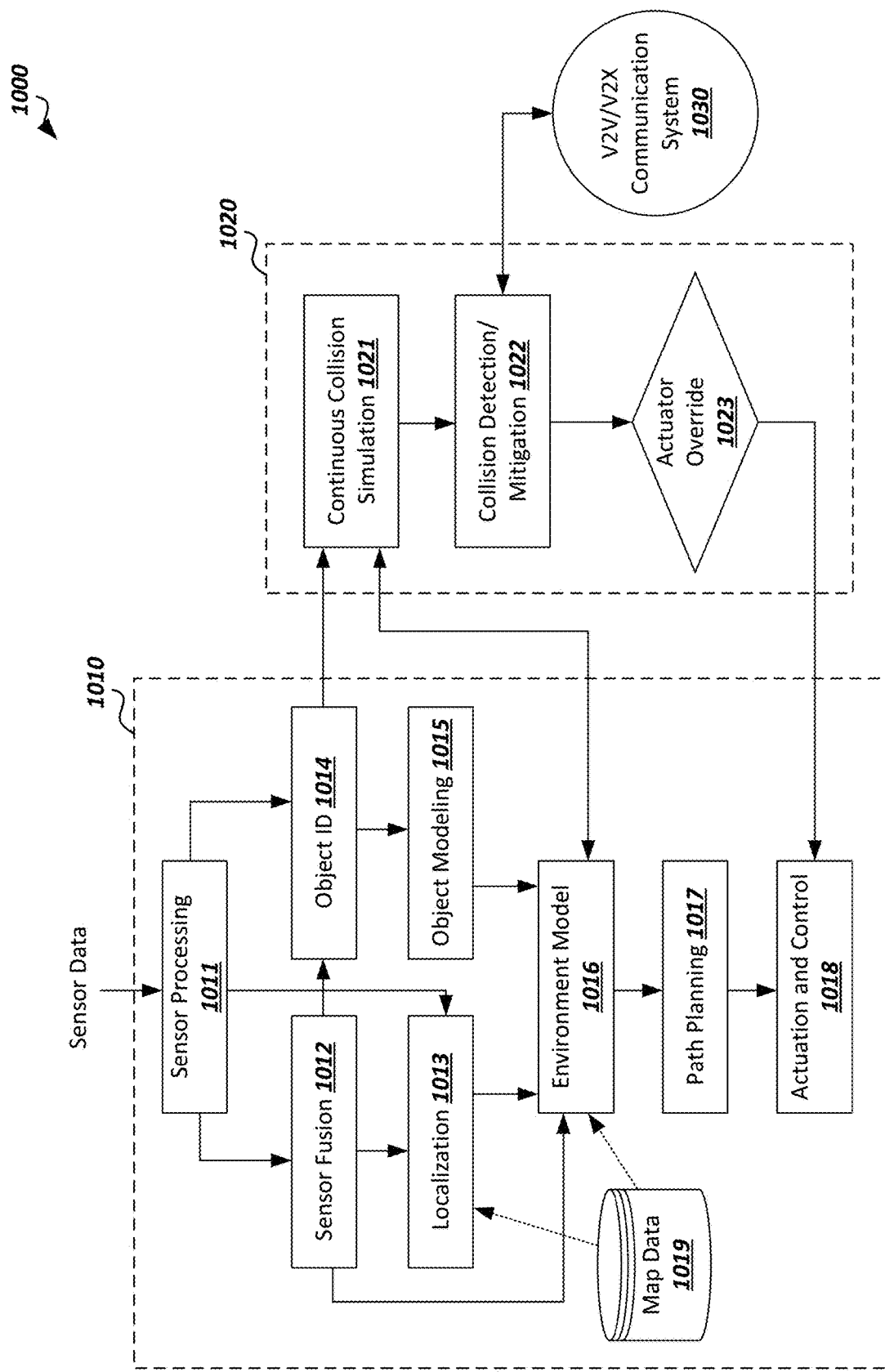
FIG. 10 is a simplified block diagram of an example autonomous vehicle control system.

FIG. 10 is a simplified block diagram of an example autonomous vehicle (AV) control system 1000. The system 1000 may be implemented by aspects of an autonomous driving system, such as the autonomous driving system 210 of FIG. 2. The example shown in FIG. 10 illustrates elements of the parallel operation between the AV's primary control system 1010 and a proactive safety system 1020. The primary control system 1010 includes a sensor processing module 1011 that receives and processes sensor data from a plurality of sensors fixedly attached to the AV. The sensor processing module 1011 may be implemented similar to, and perform the same or similar functions as, the data collection module 234 of FIG. 2. The processed sensor data is then passed to the sensor fusion module 1012. The sensor fusion module 1012 may be implemented similar to, and perform the same or similar functions as, the sensor fusion module 236 of FIG. 2. The sensor fusion module 1012 passes its output to the localization module 1013. The localization module 1013 may be implemented similar to, and perform the same or similar functions as, localization engine 240 of FIG. 2. As shown, the localization module 1013 may utilize map data 1019 to localize the AV within its environment.

The sensor fusion module 1012 also passes its output to object identification module 1014, which also receives the processed sensor data from sensor processing module 1011. The object identification module 1014 may use this data to identify certain objects (e.g., other vehicles, obstacles, infrastructure, etc.) in the vicinity of the AV. The object identification module 1014 passes its output to the object modeling module 1015, which uses the object identification module to model the identified objects.

The output of the localization module 1013 and object modeling module 1015 is then provided, along with the output of the sensor fusion module 1012, to an environment modeling module 1016. The environment modeling module 1016 may take the information provided by the other modules (along with map data 1019, as shown), and create a model of the environment around the AV, which may include a representation of the AV's surroundings and place itself within that representation. The modeled environment is used by the path planning module 1017 to determine a path for the AV to follow, which is then used by the actuation and control module 1018 to autonomously control the AV to follow the path determined by the path planning module 1017. The path planning module 1017 may be implemented similar to, and perform the same or similar functions as, the path planner 242 of FIG. 2, and the actuation and control module 1018 may be a control module that controls various actuators of the AV, such as the drive controls 220 of FIG. 2.

The proactive safety system 1020 may operate in parallel with the primary system 1010. In some instances, the proactive safety system 1020 may be an AI-driven system, such as a neural network-based safety assessment and predication system. In other cases, the proactive safety system 1020 may be a heuristic-based system. For instance, the system may determine N different combinations of paths/orientations and may select one based on information provided by the AV sensors or modeling modules (e.g., environment modeling module 1016). In the example shown, the proactive safety system 1020 includes a continuous collision simulation module 1021 that monitors information about the AV and its environment (received from the object identification module 1014 and/or the environment model 1016) and continuously simulates potential collisions and their outcomes.

The proactive safety system 1020 also includes a collision detection and mitigation module 1022 that uses the information from the object identification module 1014 and/or the environment model 1016 and the simulation information from the continuous collision simulation module 1021 to detect that a collision is imminent between the AV and another object (e.g., another vehicle and/or a structure), and also determine a collision mitigation plan. Determining the collision mitigation plan may include determining an optimal collision path for the AV, an optimal collision orientation for the AV, and/or an optimal collision orientation for the passengers of the AV, as described above. As shown, the collision detection and mitigation module 1022 may communicate with other vehicles and structures via a vehicle-to-vehicle (V2V)/vehicle-to-everything (V2X) communication system 1030 and may use this information in its collision detection and collision mitigation planning. In some cases, the collision detection and mitigation module 1022 may continuously plan paths and define emergency exit strategies for the AV.

The proactive safety system 1020 also includes an actuator override module 1023 that determines whether and when to override the actuation and control provided by the actuation and control module 1018. If the actuator override module 1023 determines to override the actuator and control module 1018, such as when a collision is determined to be imminent, the actuators of the primary system 1010 may be overridden to control the vehicle and navigate it to optimize the vehicle and passenger safety.

Figure 11:
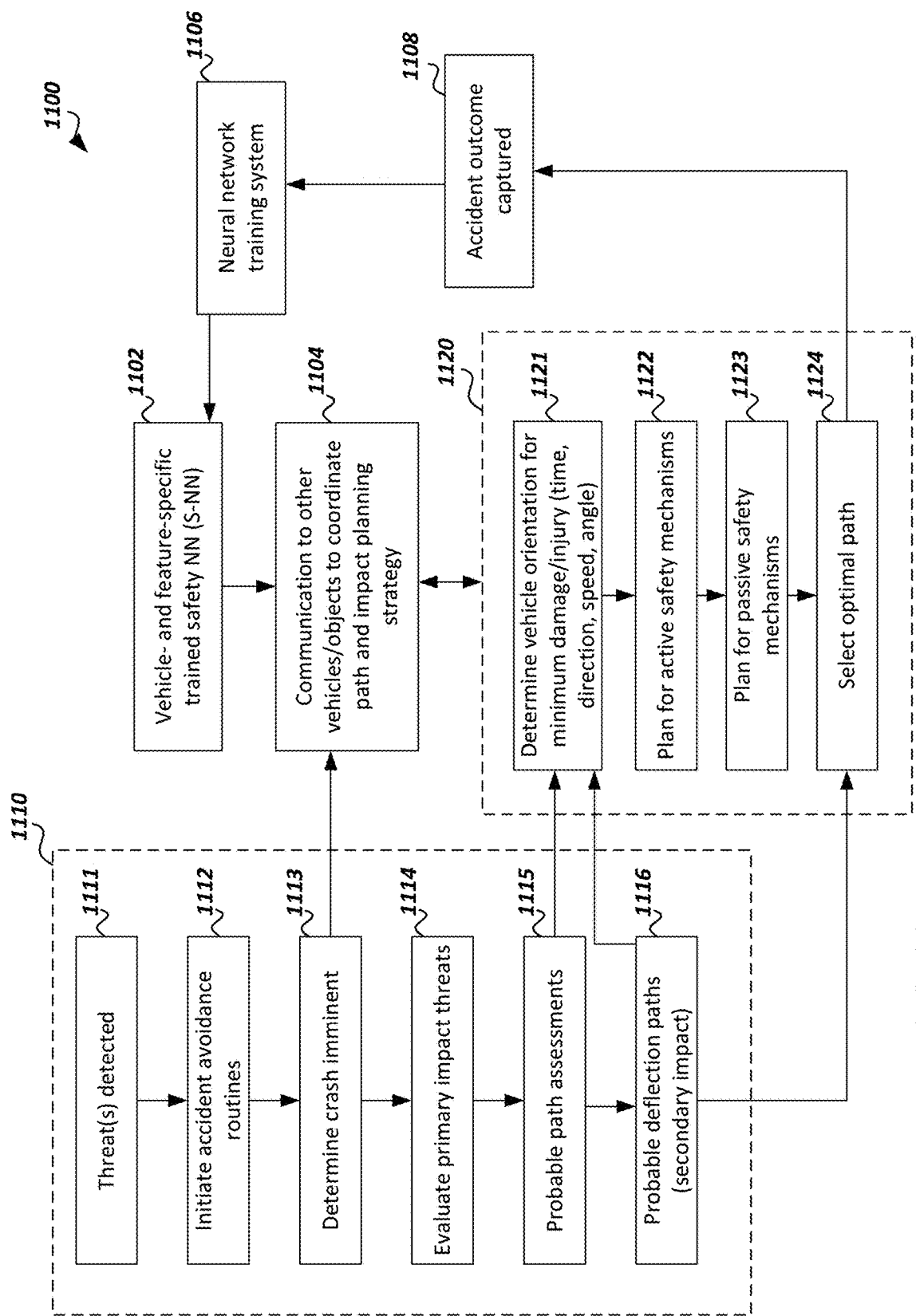
FIG. 11 is a simplified flow diagram illustrating an example decision making process for a proactive vehicle safety system.

FIG. 11 is a simplified flow diagram illustrating an example decision making process 1100 for a proactive vehicle safety system. The process 1100 may be implemented by aspects of an autonomous driving system, such as the autonomous driving system 210 of FIG. 2. The set of operations 1110 may be performed by aspects of current AV control systems, while the other operations shown represent techniques for improving a vehicle's safety system to be proactive. Thus, the additional operations shown beyond the set 1110 may transform a typical passive vehicle safety system (that is, one that merely reacts to potential or actual impacts) to a proactive vehicle safety system (that is, one that provides safety mechanisms ahead of, and based on a determination of, an imminent impact).

In the example shown, the set of operations 1110 includes detecting one or more threats (e.g., detecting an object such as a vehicle or roadside structure that the vehicle may possibly come in contact with) at 1111, initiating accident avoidance routines at 1112 (e.g., typical accident avoidance maneuvers, such as braking or steering to avoid a collision), determining that a crash is imminent at 1113 (e.g., determining that a collision between the vehicle and one or more threat(s) detected at 1111 is unavoidable), evaluating primary impact threats (e.g., the object with which the vehicle may impact first) at 1114, determining probable path assessments for the primary impact at 1115, and determining probable deflection paths for secondary impacts, if any at 1116. In some implementations the set of operations 1110 may be performed using a neural network (e.g., a neural network for machine learning models 256 of FIG. 2).

In parallel with these operations, the set of operations 1120 may also be performed. In particular, a proactive vehicle safety system may determine an optimal vehicle orientation at 1121 to minimize damage to the vehicle and/or injury to its passengers or others. The system may take into account the vehicle's safety information (e.g., locations of crumple zones, airbags, seatbelts, roll bars/cages, or other passive safety mechanisms and/or information related to accident testing or real-world accident data (as described below)), the vehicle's dynamics (e.g., braking, steering, or other handling capabilities, including accounting for aging, wear, or replacement of such systems), current direction of travel, current speed, distance to the primary and/or secondary impact threats, the number and type of critical objects in a probable impact path (from operations 1115, 1116), weight in the vehicle (e.g., location of weight, in trunk vs. front seats, back seats etc.), passenger location, age, size or other information about the passengers of the vehicle, or other information such as the same/similar information from other vehicles or information from infrastructure or other objects.

In some implementations, a vehicle- and/or feature-specific trained neural network may be used to determine the optimal vehicle orientation, as described below.

The system may then determine a plan for engaging active safety mechanisms (e.g., modifying seat or cabin positions/orientations (as described above), disabling fuel systems, disabling electrical systems, engaging/disengaging door locks, opening/closing windows, etc.) for the vehicle at 1122, and for engaging passive safety mechanisms (e.g., controlling the deployment of airbags (e.g., rate of inflation, timing or order of airbag deployment among multiple airbags, deploying only certain airbags), engaging roll bar/cage mechanisms) for the vehicle at 1123.

Based on the probable path information, the determined vehicle orientation, and plans for active and passive safety mechanisms, the vehicle may then select an optimal path to follow until it comes to a rest. This may include autonomously controlling actuators of the vehicle to direct the vehicle toward/along the path selected at 1124, which may include overriding actual actuator inputs (e.g., from a driver of the vehicle).

After the collision, information related to the collision may be collected at 1108 and passed to a neural network training system 1106 to produce a vehicle- and feature-specific trained neural network 1102 (which is used by the vehicle to determine an optimal orientation for the imminent collision at 1121). In addition, at 1104, the vehicle may use the neural network to communicate with other vehicles or objects in its vicinity to coordinate path and impact planning strategies between the vehicles/objects.

In some cases, the neural network training system 1106 may use emulated or simulated environments to train the neural network based on the vehicle's own structural safety (crumple zones, protective zones, etc.). Further, in some implementations, the neural network can be trained using crash test data (e.g., from NTSB or other safety/regulatory organizations) or real-world crash data (reported by the vehicle itself or by other, similar vehicles in the field) to train the neural network. In some cases, the neural network may be trained based on vehicle dynamics. Current pathfinding training system may be used in the neural network training process. For instance, AI-based reinforcement learning may be used, based on simulations of the vehicle driving on different paths in various environments. The simulations may have the environments built into them, plus certain information about the particular vehicle under simulation (e.g., build information, crash data, etc.). The simulations may have pre-defined orientations of the vehicle and its occupants to choose from and may simulate each in different scenarios to determine optimal impact orientations. For instance, an optimal orientation for hitting a wall (broad surface object) may be different from an optimal orientation for hitting a traffic light post (strong, narrow object), which may be different from an optimal impact orientation for hitting another vehicle (which may be between the other two objects in terms of being narrow/broad), which may be different from an optimal impact orientation for a bush or other relatively soft object. The neural network can be trained to minimize harm to passengers, minimize harm to surrounding vehicles/structures, or a combination of both (e.g., with more weight toward minimizing harm to the vehicle's own passengers).

As the vehicle and its systems age, the neural network training system 1106 can incorporate the vehicle's behavior changes to its models. For instance, the neural network may take into account whether the vehicle has been in accident before, e.g., to know if there are structural areas that are now compromised when compared with a new version of the vehicle. The neural network may use this information to determine an optimal orientation that is different from an orientation previously determined to be optimal for the same scenario (e.g., it may avoid previously impacted areas in a new accident, as they may now be compromised). The neural network may also take into account changes in the vehicle's dynamics, such as braking, steering, etc. The neural network may be continuously trained using this information to ensure that the safety models are as up-to-date and accurate for the particular vehicle as possible.

Figure 12:
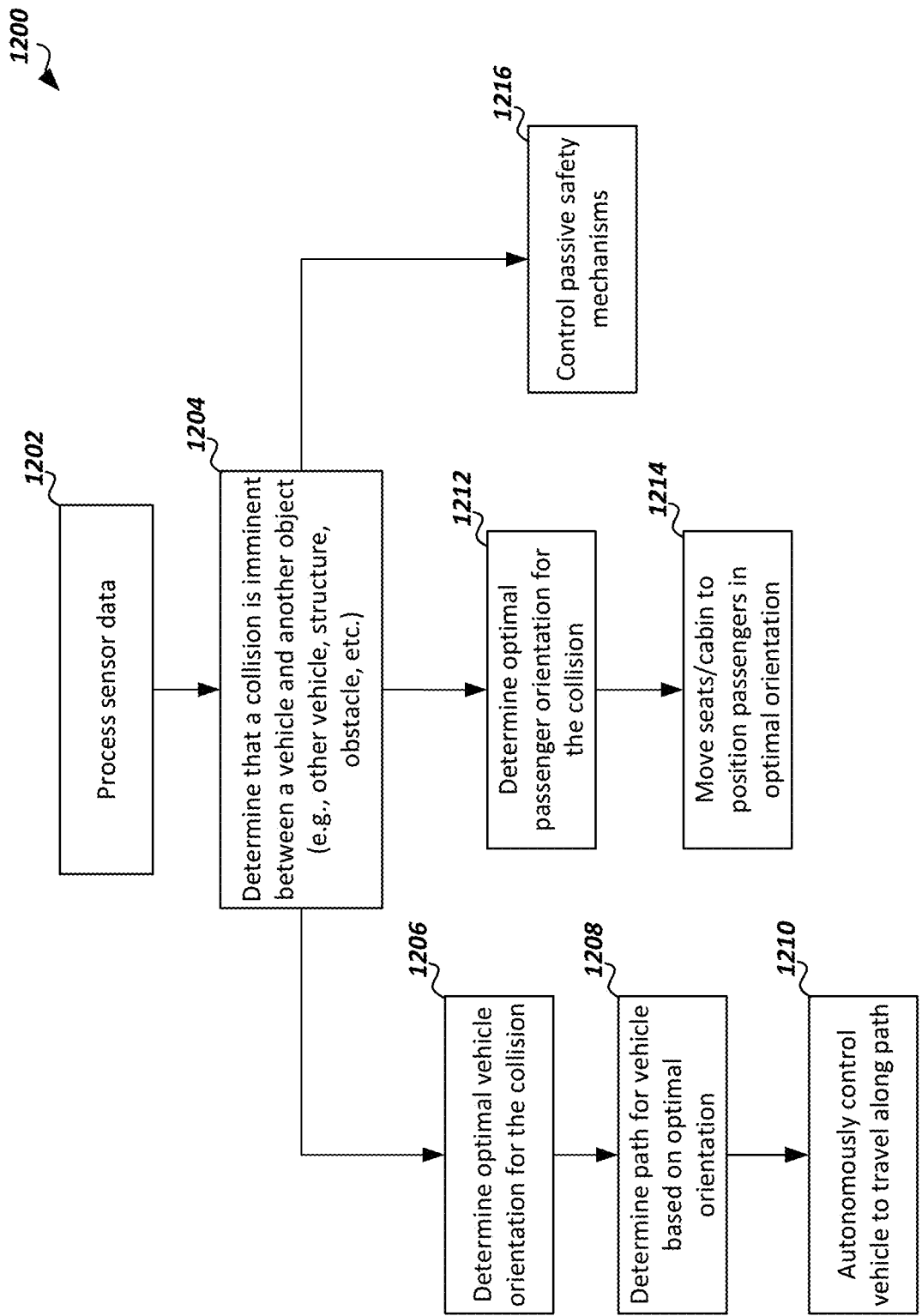
FIG. 12 is a flowchart illustrating an example process of controlling an autonomous vehicle to implement a proactive safety system

FIG. 12 is a flowchart 1200 illustrating an example process of controlling an autonomous vehicle to implement a proactive safety system. The process shown in FIG. 12 may be performed by a control system of an autonomous vehicle (e.g., various components of the vehicle 105 of FIG. 2, or a system modeled after the system 1000 of FIG. 10). The example process may include additional or different operations, and the operations may be performed in the order shown or in another order. In some cases, one or more of the operations shown in FIG. 12 are implemented as processes that include multiple operations, sub-processes, or other types of routines. In some cases, operations can be combined, performed in another order, performed in parallel, iterated, or otherwise repeated or performed another manner.

At 1202, sensor data generated by one or more sensors connected to a vehicle is processed. The sensor data may include data from sensors similar to the sensors 225 of FIG. 2.

At 1204, it is determined that a collision between the vehicle and another object (e.g., another vehicle, roadside object, infrastructure, building, etc.) is imminent. Determining that a collision is imminent may include determining that the collision is unavoidable given a vehicle's current dynamics (e.g., speed) and its environment (e.g., location of objects around the vehicle and respective distances to those objects).

At 1206, an optimal vehicle orientation for the collision (e.g., direction or angle of the vehicle at impact) is determined, and at 1208, a path is determined to position the vehicle toward the optimal orientation. The optimal vehicle orientation may be determined, in some instances, using a neural network trained based one or more of static safety information for the vehicle, crash test information for the vehicle, and real-world accident information for the vehicle (e.g., as described above). In other instances, the determination may be made heuristically. The optimal vehicle orientation may be based on a determined likelihood of injury to the passengers of the vehicle, and thus may be based on information about the passengers of the vehicle (e.g., a location of the passenger(s) in the vehicle, an age of the passenger(s), or a size of the passenger(s)). In addition, in some instance, the determination may be based on information received from other vehicles or objects (e.g., buildings, roadside units, structures, etc.) in the vicinity of the vehicle. In these cases, the vehicle and the other object(s) may coordinate to determine the optimal orientation for collision. Likewise, the vehicle may transmit its own determined path or optimal vehicle orientation to other vehicles/objects for coordination. At 1210, the vehicle is controlled autonomously to travel along the path determined at 1208. This may include overriding driver inputs, in some instances.

At 1212, an optimal passenger orientation for the collision is determined, and at 1214, the seats or cabin of the vehicle is/are moved to position the passengers in the optimal passenger orientation(s) determined at 1212.

At 1216, one or more passive safety mechanisms of the vehicle are controlled. This may include, in some instances, timing releases for a set of airbags, ordering releases for the set of airbags, or determining an airbag inflation rate for a set of airbags, or engaging roll bars/cages.

Figure 13:
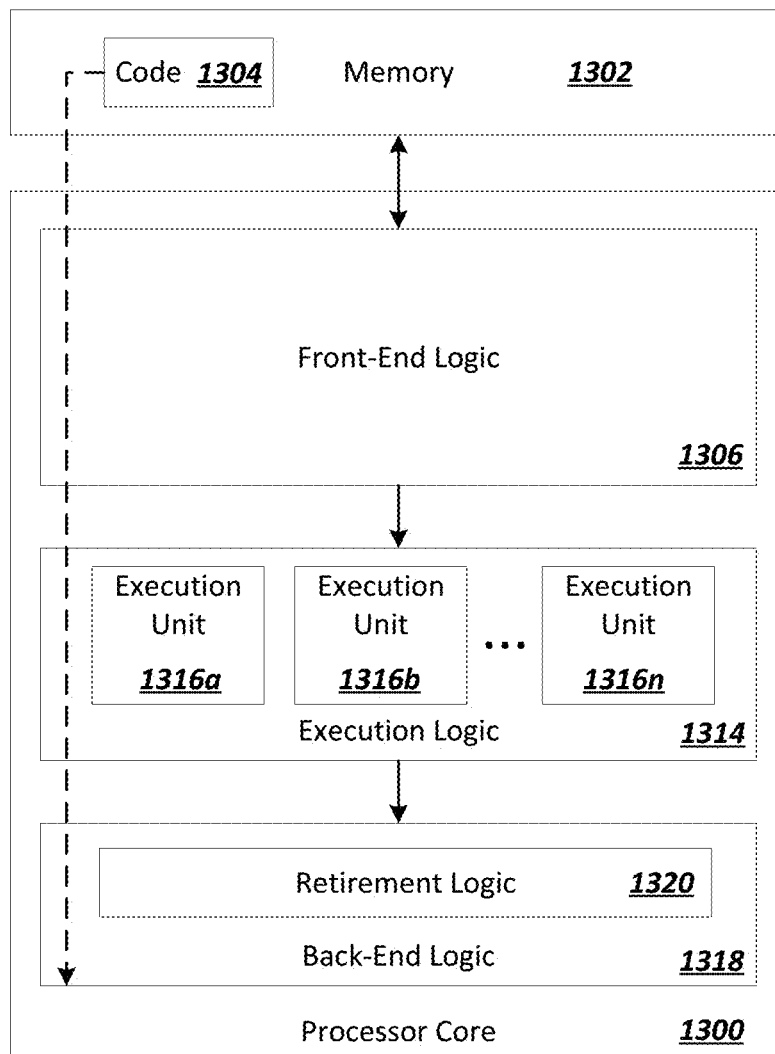
FIG. 13 is a block diagram of an exemplary processor in accordance with some embodiments.
Figure 14:
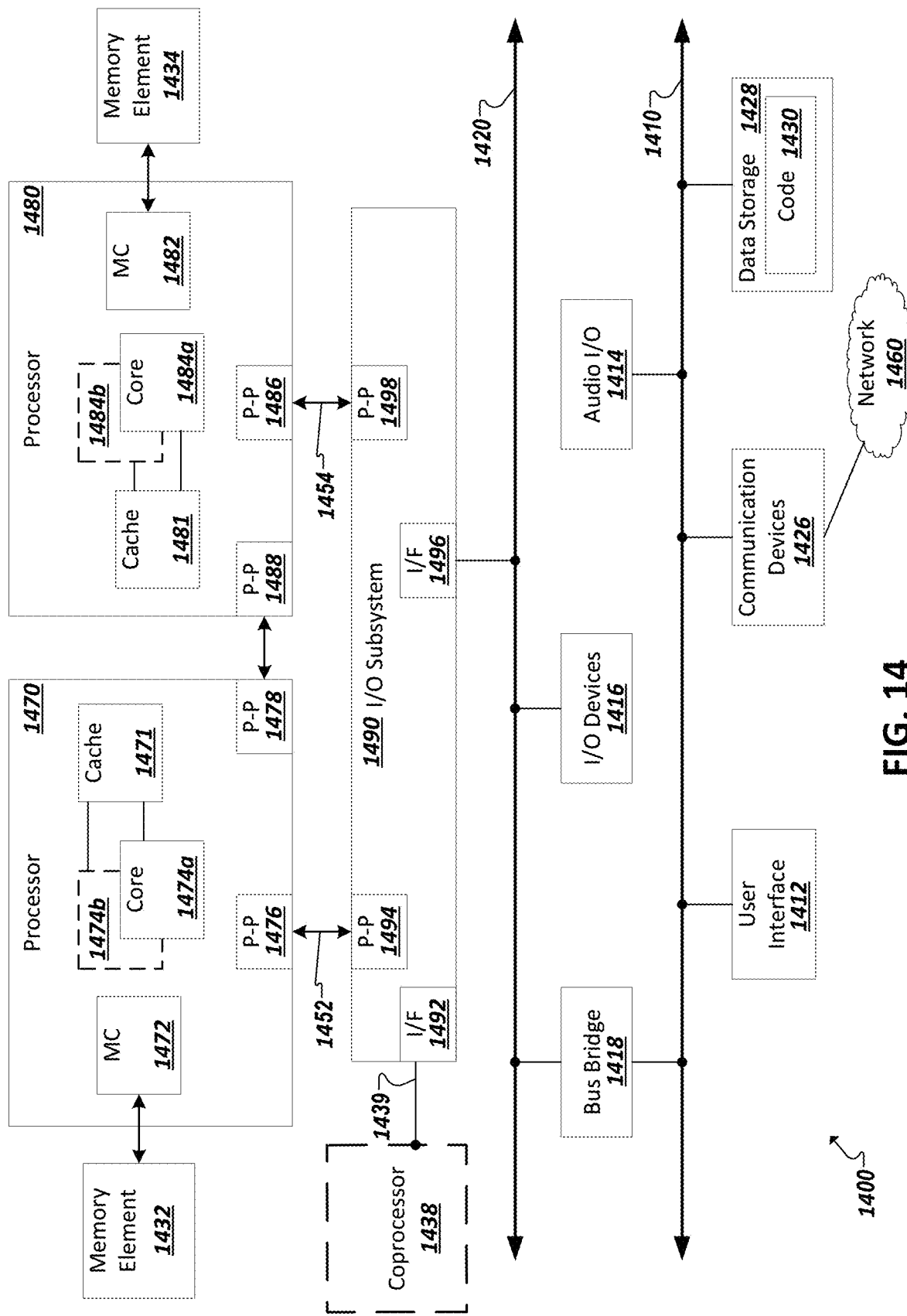
FIG. 14 is a block diagram of an exemplary computing system in accordance with some embodiments.

FIGS. 13-14 are block diagrams of exemplary computer architectures that may be used in accordance with embodiments disclosed herein. Other computer architecture designs known in the art for processors and computing systems may also be used. Generally, suitable computer architectures for embodiments disclosed herein can include, but are not limited to, configurations illustrated in FIGS. 13-14.

FIG. 13 is an example illustration of a processor according to an embodiment. Processor 1300 is an example of a type of hardware device that can be used in connection with the implementations above. Processor 1300 may be any type of processor, such as a microprocessor, an embedded processor, a digital signal processor (DSP), a network processor, a multi-core processor, a single core processor, or other device to execute code. Although only one processor 1300 is illustrated in FIG. 13, a processing element may alternatively include more than one of processor 1300 illustrated in FIG. 13. Processor 1300 may be a single-threaded core or, for at least one embodiment, the processor 1300 may be multi-threaded in that it may include more than one hardware thread context (or "logical processor") per core.

FIG. 13 also illustrates a memory 1302 coupled to processor 1300 in accordance with some embodiments. Memory 1302 may be any of a wide variety of memories (including various layers of memory hierarchy) as are known or otherwise available to those of skill in the art. Such memory elements can include, but are not limited to, random access memory (RAM), read only memory (ROM), logic blocks of a field programmable gate array (FPGA), erasable programmable read only memory (EPROM), and electrically erasable programmable ROM (EEPROM).

Processor 1300 can execute any type of instructions associated with algorithms, processes, or operations detailed herein. Generally, processor 1300 can transform an element or an article (e.g., data) from one state or thing to another state or thing.

Code 1304, which may be one or more instructions to be executed by processor 1300, may be stored in memory 1302, or may be stored in software, hardware, firmware, or any suitable combination thereof, or in any other internal or external component, device, element, or object where appropriate and based on particular needs. In one example, processor 1300 can follow a program sequence of instructions indicated by code 1304. Each instruction enters a front-end logic 1306 and is processed by one or more decoders. The decoder may generate, as its output, a micro operation such as a fixed width micro operation in a predefined format, or may generate other instructions, microinstructions, or control signals that reflect the original code instruction. Front-end logic 1306 also includes register renaming logic and scheduling logic, which generally allocate resources and queue the operation corresponding to the instruction for execution.

Processor 1300 can also include execution logic 1314 having a set of execution units 1316a, 1316b, 1316n, etc. Some embodiments may include a number of execution units dedicated to specific functions or sets of functions. Other embodiments may include only one execution unit or one execution unit that can perform a particular function. Execution logic 1314 performs the operations specified by code instructions.

After completion of execution of the operations specified by the code instructions, back-end logic 1318 can retire the instructions of code 1304. In one embodiment, processor 1300 allows out of order execution but requires in order retirement of instructions. Retirement logic 1320 may take a variety of known forms (e.g., re-order buffers or the like). In this manner, processor 1300 is transformed during execution of code 1304, at least in terms of the output generated by the decoder, hardware registers and tables utilized by register renaming logic 1310, and any registers (not shown) modified by execution logic 1314.

Although not shown in FIG. 13, a processing element may include other elements on a chip with processor 1300. For example, a processing element may include memory control logic along with processor 1300. The processing element may include I/O control logic and/or may include I/O control logic integrated with memory control logic. The processing element may also include one or more caches. In some embodiments, non-volatile memory (such as flash memory or fuses) may also be included on the chip with processor 1300.

FIG. 14 illustrates a computing system 1400 that is arranged in a point-to-point (PtP) configuration according to an embodiment. In particular, FIG. 14 shows a system where processors, memory, and input/output devices are interconnected by a number of point-to-point interfaces. Generally, one or more of the computing systems described herein may be configured in the same or similar manner as computing system 1300.

Processors 1470 and 1480 may each include one or more cores (e.g., 1474a, 1474b of processor 1470, and 1484a, 1484b of processor 1480) coupled to a cache (e.g., cache 1471 of processor 1470 and cache 1481 of processor 1480). Processors 1470 and 1480 may also each include integrated memory controller logic (MC) 1472 and 1482 to communicate with memory elements 1432 and 1434. In alternative embodiments, memory controller logic 1472 and 1482 may be discrete logic separate from processors 1470 and 1480. Memory elements 1432 and/or 1434 may store various data to be used by processors 1470 and 1480 in achieving operations and functionality outlined herein.

Processors 1470 and 1480 may be any type of processor, such as those discussed in connection with other figures. Processors 1470 and 1480 may exchange data via a point-to-point (PtP) interface using point-to-point interface circuits 1478 and 1488, respectively. Processors 1470 and 1480 may each exchange data with a chipset 1490 via individual point-to-point interfaces 1452 and 1454 using point-to-point interface circuits 1476, 1486, 1494, and 1498. Chipset 1490 may also exchange data with a co-processor 1438, such as a high-performance graphics circuit, machine learning accelerator, or other co-processor 1438, via an interface 1439, which could be a PtP interface circuit. In alternative embodiments, any or all of the PtP links illustrated in FIG. 14 could be implemented as a multi-drop bus rather than a PtP link.

Chipset 1490 may be in communication with a bus 1420 via an interface circuit 1496. Bus 1420 may have one or more devices that communicate over it, such as a bus bridge 1418 and I/O devices 1416. Via a bus 1410, bus bridge 1418 may be in communication with other devices such as a user interface 1412 (such as a keyboard, mouse, touchscreen, or other input devices), communication devices 1426 (such as modems, network interface devices, or other types of communication devices that may communicate through a computer network 1460), audio I/O devices 1414, and/or a data storage device 1428. Data storage device 1428 may store code 1430, which may be executed by processors 1470 and/or 1480. In alternative embodiments, any portions of the bus architectures could be implemented with one or more PtP links.

The computer system depicted in FIG. 14 is a schematic illustration of an embodiment of a computing system that may be utilized to implement various embodiments discussed herein. It will be appreciated that various components of the system depicted in FIG. 14 may be combined in a system-on-a-chip (SoC) architecture or in any other suitable configuration capable of achieving the functionality and features of examples and implementations provided herein.

While some of the systems and solutions described and illustrated herein have been described as containing or being associated with a plurality of elements, not all elements explicitly illustrated or described may be utilized in each alternative implementation of the present disclosure. Additionally, one or more of the elements described herein may be located external to a system, while in other instances, certain elements may be included within or as a portion of one or more of the other described elements, as well as other elements not described in the illustrated implementation. Further, certain elements may be combined with other components, as well as used for alternative or additional purposes in addition to those purposes described herein.

Further, it should be appreciated that the examples presented above are non-limiting examples provided merely for purposes of illustrating certain principles and features and not necessarily limiting or constraining the potential embodiments of the concepts described herein. For instance, a variety of different embodiments can be realized utilizing various combinations of the features and components described herein, including combinations realized through the various implementations of components described herein. Other implementations, features, and details should be appreciated from the contents of this Specification.

Although this disclosure has been described in terms of certain implementations and generally associated methods, alterations and permutations of these implementations and methods will be apparent to those skilled in the art. For example, the actions described herein can be performed in a different order than as described and still achieve the desirable results. As one example, the processes depicted in the accompanying figures do not necessarily require the particular order shown, or sequential order, to achieve the desired results. In certain implementations, multitasking and parallel processing may be advantageous. Additionally, other user interface layouts and functionality can be supported. Other variations are within the scope of the following claims.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

In general, "servers," "clients," "computing devices," "network elements," "hosts," "blocks," "platforms", "sensor devices," "edge device," "autonomous driving systems", "autonomous vehicles", "fog-based system", "cloud-based system", and "systems" generally, etc. discussed herein can include electronic computing devices operable to receive, transmit, process, store, or manage data and information associated with an autonomous driving environment. As used in this document, the term "computer," "processor," "processor device," or "processing device" is intended to encompass any suitable processing apparatus, including central processing units (CPUs), graphical processing units (GPUs), application specific integrated circuits (ASICs), field programmable gate arrays (FPGAs), digital signal processors (DSPs), tensor processors and other matrix arithmetic processors, among other examples. For example, elements shown as single devices within the environment may be implemented using a plurality of computing devices and processors, such as server pools including multiple server computers. Further, any, all, or some of the computing devices may be adapted to execute any operating system, including Linux, UNIX, Microsoft Windows, Apple OS, Apple iOS, Google Android, Windows Server, etc., as well as virtual machines adapted to virtualize execution of a particular operating system, including customized and proprietary operating systems.

Any of the flows, methods, processes (or portions thereof) or functionality of any of the various components described above or illustrated in the figures may be performed by any suitable computing logic, such as one or more modules, engines, blocks, units, models, systems, or other suitable computing logic. Reference herein to a "module", "engine", "block", "unit", "model", "system" or "logic" may refer to hardware, firmware, software and/or combinations of each to perform one or more functions. As an example, a module, engine, block, unit, model, system, or logic may include one or more hardware components, such as a micro-controller or processor, associated with a non-transitory medium to store code adapted to be executed by the micro-controller or processor. Therefore, reference to a module, engine, block, unit, model, system, or logic, in one embodiment, may refers to hardware, which is specifically configured to recognize and/or execute the code to be held on a non-transitory medium. Furthermore, in another embodiment, use of module, engine, block, unit, model, system, or logic refers to the non-transitory medium including the code, which is specifically adapted to be executed by the microcontroller or processor to perform predetermined operations. And as can be inferred, in yet another embodiment, a module, engine, block, unit, model, system, or logic may refer to the combination of the hardware and the non-transitory medium. In various embodiments, a module, engine, block, unit, model, system, or logic may include a microprocessor or other processing element operable to execute software instructions, discrete logic such as an application specific integrated circuit (ASIC), a programmed logic device such as a field programmable gate array (FPGA), a memory device containing instructions, combinations of logic devices (e.g., as would be found on a printed circuit board), or other suitable hardware and/or software. A module, engine, block, unit, model, system, or logic may include one or more gates or other circuit components, which may be implemented by, e.g., transistors. In some embodiments, a module, engine, block, unit, model, system, or logic may be fully embodied as software. Software may be embodied as a software package, code, instructions, instruction sets and/or data recorded on non-transitory computer readable storage medium. Firmware may be embodied as code, instructions or instruction sets and/or data that are hard-coded (e.g., nonvolatile) in memory devices. Furthermore, logic boundaries that are illustrated as separate commonly vary and potentially overlap. For example, a first and second module (or multiple engines, blocks, units, models, systems, or logics) may share hardware, software, firmware, or a combination thereof, while potentially retaining some independent hardware, software, or firmware.

The flows, methods, and processes described above and in the accompanying figures are merely representative of functions that may be performed in particular embodiments. In other embodiments, additional functions may be performed in the flows, methods, and processes. Various embodiments of the present disclosure contemplate any suitable signaling mechanisms for accomplishing the functions described herein. Some of the functions illustrated herein may be repeated, combined, modified, or deleted within the flows, methods, and processes where appropriate. Additionally, functions may be performed in any suitable order within the flows, methods, and processes without departing from the scope of particular embodiments.

The following examples pertain to embodiments in accordance with this Specification. It will be understood that, in some instances, one or more aspects certain examples described below may be combined with other examples.

Example 1 includes at least one machine accessible storage medium having instructions stored thereon, wherein the instructions when executed on a machine, cause the machine to: access sensor data generated by one or more connected sensors connected to a vehicle; determine, at the vehicle, that a collision between the vehicle and another object is imminent; determine, at the vehicle, an optimal vehicle orientation for the collision based on the determination that the collision is imminent; determine, at the vehicle, a vehicle path to position the vehicle in the optimal vehicle orientation; and autonomously control the vehicle to travel along the determined vehicle path.

Example 2 includes the subject matter of Example 1, and optionally, wherein the instructions are further executable to cause the machine to: determine an optimal passenger orientation for the collision; and autonomously move one or more seats of the vehicle to position a passenger toward the optical passenger orientation in advance of the collision.

Example 3 includes the subject matter of Example 1 or 2, and optionally, wherein the instructions are further executable to cause the machine to control activation of one or more passive safety mechanisms at or near the time of the collision.

Example 4 includes the subject matter of Example 3, and optionally, wherein controlling activation the one or more passive safety mechanisms comprises one or more of timing releases for a set of airbags, ordering releases for the set of airbags, and determining an airbag inflation rate for a set of airbags.

Example 5 includes the subject matter of any preceding Example, and optionally, wherein the instructions are further executable to cause the machine to determine the optimal vehicle orientation using a neural network trained based one or more of static safety information for the vehicle, crash test information for the vehicle, and real-world accident information for the vehicle.

Example 6 includes the subject matter of any preceding Example, and optionally, wherein the instructions are further executable to cause the machine to determine the optimal vehicle orientation heuristically.

Example 7 includes the subject matter of any preceding Example, and optionally, wherein the instructions are further executable to cause the machine to determine the optimal vehicle orientation based on a likelihood of injury to passengers of the vehicle.

Example 8 includes the subject matter of Example 7, and optionally, wherein the imminent collision is between the vehicle and another vehicle, and the instructions are further executable to cause the machine to determine the optimal vehicle collision orientation further based on a likelihood of injury to passengers of the other vehicle.

Example 9 includes the subject matter of any preceding Example, and optionally, wherein the instructions are further executable to cause the machine to determine the optimal vehicle orientation based on one or more of information received from other vehicles in the vicinity of the vehicle and information received from infrastructure objects in the vicinity of the vehicle.

Example 10 includes the subject matter of any preceding Example, and optionally, wherein the instructions are further executable to cause the machine to determine the optimal vehicle orientation based on information about at least one passenger in the vehicle.

Example 11 includes the subject matter of Example 10, and optionally, wherein the instructions are further executable to cause the machine to determine the optical vehicle orientation based on one or more of a location of the passenger in the vehicle, an age of the passenger, and a size of the passenger.

Example 12 includes the subject matter of any preceding Example, and optionally, wherein the instructions are further executable to cause the machine to autonomously control the vehicle by overriding inputs from a driver of the vehicle.

Example 13 includes the subject matter of any preceding Example, and optionally, wherein the instructions are further executable to cause the machine to cause information to be transmitted to other vehicles or infrastructure objects about the determined vehicle path or the optimal vehicle orientation.

Example 14 includes the subject matter of Example 9 and/or 13, and optionally, wherein the instructions are further executable to cause the machine to determine he vehicle path in coordination with the other vehicles or infrastructure.

Example 15 is a method comprising processing sensor data generated by one or more sensors connected to a vehicle; determining, using at least one data processor of the vehicle based on the sensor data, that a collision between the vehicle and another object is imminent; determining, using at least one data processor of the vehicle, an optimal vehicle orientation for the collision based on the determination that the collision is imminent; determining, using at least one data processor of the vehicle, a vehicle path to position the vehicle in the optimal vehicle orientation; and autonomously controlling the vehicle to travel along the determined vehicle path.

Example 16 includes the subject matter of Example 15, and optionally, further comprising determining, using at least one data processor of the vehicle, an optimal passenger orientation for the collision; and autonomously moving seats of the vehicle to position a passenger toward the optical passenger orientation in advance of the collision.

Example 17 includes the subject matter of Example 15, and optionally, further comprising controlling, by at least one data processor of the vehicle, one or more passive safety mechanisms at or near the time of the collision.

Example 18 includes the subject matter of Example 17, and optionally, wherein controlling the one or more passive safety mechanisms comprises one or more of timing releases for a set of airbags, ordering releases for the set of airbags, and determining an airbag inflation rate for a set of airbags Example 19 includes the subject matter of any preceding Example method, and optionally, wherein the optimal vehicle orientation is determined using a neural network trained based one or more of static safety information for the vehicle, crash test information for the vehicle, and real-world accident information for the vehicle.

Example 20 includes the subject matter of any preceding Example method, and optionally, wherein the optimal vehicle orientation is determined heuristically.

Example 21 includes the subject matter of any preceding Example method, and optionally, wherein determining the optimal vehicle orientation is based on a determined likelihood of injury to passengers of the vehicle.

Example 22 includes the subject matter of Example 21, and optionally, wherein the imminent collision is between the vehicle and another vehicle, and determining the optimal vehicle collision orientation is further based on a determined likelihood of injury to passengers of the other vehicle.

Example 23 includes the subject matter of any preceding Example method, and optionally, wherein determining the optimal vehicle orientation is based on one or more of information received from other vehicles in the vicinity of the vehicle, and information received from infrastructure objects in the vicinity of the vehicle.

Example 24 includes the subject matter of any preceding Example method, and optionally, wherein determining the optimal vehicle orientation is based on information about at least one passenger in the vehicle.

Example 25 includes the subject matter of Example 24, and optionally, wherein the information about the at least one passenger comprises one or more of a location of the passenger in the vehicle, an age of the passenger, and a size of the passenger.

Example 26 includes the subject matter of any preceding Example method, and optionally, wherein autonomously controlling the vehicle comprises overriding inputs from a driver of the vehicle.

Example 27 includes the subject matter of any preceding Example method, and optionally, further comprising transmitting information to other vehicles or infrastructure objects about the positioning of the vehicle toward the optimal vehicle orientation.

Example 28 includes the subject matter of Example 23 and/or 27, and optionally, wherein the vehicle path is determined in coordination with the other vehicles or infrastructure.

Example 29 includes a system comprising one or more processors; memory; a set of sensors; and an autonomous driving system, executable by the one or more processors to:

detect a collision threat based on an environment model for a vehicle generated at least partially based on data from the set of sensors; determine that a collision between a vehicle and the collision threat is unavoidable based on the environment model and current vehicle dynamics; determine a collision mitigation plan for the vehicle based on the determination that the collision is imminent, wherein the collision mitigation plan indicates a particular collision orientation for the vehicle and a particular vehicle path; and autonomously control the vehicle to implement the collision mitigation plan.

Example 30 includes the subject matter of Example 29, and optionally, wherein the collision mitigation plan further indicates an optimal passenger orientation for the collision, and the autonomous driving system is further executable by the one or more processors to autonomously move one or more seats of the vehicle to position a passenger toward the optical passenger orientation in advance of the collision.

Example 31 includes the subject matter of Example 29 or 30, and optionally, wherein the collision mitigation plan further indicates an activation plan for one or more passive safety mechanisms of the vehicle, and the autonomous driving system is further executable by the one or more processors to autonomously control activation of one or more passive safety mechanisms according to the activation plan.

Example 32 includes the subject matter of any preceding Example system, and optionally, further comprising a machine learning model trained based on one or more of static safety information for the vehicle, crash test information for the vehicle, and real-world accident information for the vehicle, wherein the autonomous driving system is to determine the optimal vehicle orientation using the machine learning model.

Example 33 includes the subject matter of any preceding Example system, and optionally, wherein the autonomous driving system is to determine the collision mitigation plan based on one or more of locations of passengers in the vehicle, ages of passengers in the vehicle, sizes of passengers in the vehicle, a likelihood of injury to passengers of the vehicle, a likelihood of injury to passengers of other vehicles in the vicinity of the vehicle, a likelihood of injury to pedestrians in the vicinity of the vehicle, and a likelihood of damage to one or more objects in the vicinity of the vehicle.

Example 34 includes an autonomous vehicle system, comprising: means for determining that a collision between the autonomous vehicle and another object is imminent based on data obtained from sensors attached to the autonomous vehicle; means for determining an optimal vehicle orientation for the collision based on the determination that the collision is imminent; means for determining a vehicle path to position the vehicle in the optimal vehicle orientation; and means for autonomously controlling the autonomous vehicle to travel along the determined vehicle path.

Example 35 includes the subject matter of Example 34, and optionally, further comprising means for determining an optimal passenger orientation for the collision; and means for moving seats of the vehicle to position a passenger toward the optical passenger orientation in advance of the collision.

Example 36 includes the subject matter of any preceding Example autonomous vehicle system, and optionally, further comprising means to control one or more passive safety mechanisms of the vehicle at or near the time of the collision.

Example 37 includes the subject matter of any preceding Example autonomous vehicle system, and optionally, wherein the means for determining the optimal vehicle orientation includes a neural network trained based one or more of static safety information for the vehicle, crash test information for the vehicle, and real-world accident information for the vehicle.

Example 38 includes a device of an autonomous vehicle comprising logic, modules, circuitry, or other means to perform one or more elements of a method described in or related to any of the examples above or any other method or process described herein.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results.

What is claimed is:

1. At least one non-transitory machine accessible storage medium having instructions stored thereon, wherein the instructions when executed on a machine, cause the machine to:
   access sensor data generated by one or more sensors connected to a vehicle;
   determine, at the vehicle, that a collision between the vehicle and another object is imminent;
   determine, at the vehicle, an optimal vehicle orientation for the collision and a passive safety mechanism activation plan based on the determination that the collision is imminent, wherein the passive safety mechanism activation plan is determined based on the optimal vehicle orientation for the collision and indicates activation timing for one or more passive safety mechanisms of the vehicle, including one or more of release timings for a set of airbags and release ordering for the set of airbags, at least one passive safety mechanism to be activated prior to the collision;
   determine, at the vehicle, a vehicle path to position the vehicle in the optimal vehicle orientation; and
   autonomously control the vehicle to travel along the determined vehicle path and control activation of passive safety mechanisms of the vehicle according to the passive safety mechanism activation plan.

2. The storage medium of claim 1, wherein the instructions are further executable to cause the machine to:
   determine an optimal passenger orientation for the collision; and
   autonomously move one or more seats of the vehicle to position a passenger toward the optimal passenger orientation in advance of the collision.

3. The storage medium of claim 1, wherein determining the passive safety mechanism activation plan comprises determining an airbag inflation rate for the set of airbags.

4. The storage medium of claim 1, wherein the instructions are further executable to cause the machine to determine the optimal vehicle orientation using a neural network trained based on one or more of static safety information for the vehicle, crash test information for the vehicle, and real-world accident information for the vehicle.

5. The storage medium of claim 1, wherein the instructions are further executable to cause the machine to determine the optimal vehicle orientation heuristically.

6. The storage medium of claim 1, wherein the instructions are further executable to cause the machine to determine the optimal vehicle orientation based on a likelihood of injury to passengers of the vehicle.

7. The storage medium of claim 6, wherein the imminent collision is between the vehicle and another vehicle, and the instructions are further executable to cause the machine to determine the optimal vehicle collision orientation further based on a likelihood of injury to passengers of the other vehicle.

8. The storage medium of claim 1, wherein the instructions are further executable to cause the machine to determine the optimal vehicle orientation based on one or more of information received from other vehicles in the vicinity of the vehicle and information received from infrastructure objects in the vicinity of the vehicle.

9. The storage medium of claim 8, wherein the instructions are further executable to cause the machine to determine the vehicle path in coordination with the other vehicles or infrastructure.

10. The storage medium of claim 1, wherein the instructions are further executable to cause the machine to determine the optimal vehicle orientation based on information about one or more passengers in the vehicle.

11. The storage medium of claim 10, wherein the instructions are further executable to cause the machine to determine the optimal vehicle orientation based on one or more of locations of the one or more passengers in the vehicle, ages of the one or more passengers, and sizes of one or more passengers.

12. The storage medium of claim 1, wherein the instructions are further executable to cause the machine to override inputs from a driver of the vehicle.

13. A method, comprising:
processing sensor data generated by one or more sensors connected to a vehicle;
determining, using at least one data processor of the vehicle based on the sensor data, that a collision between the vehicle and another object is imminent;
determining, using at least one data processor of the vehicle, an optimal vehicle orientation for the collision and a passive safety mechanism activation plan based on the determination that the collision is imminent, wherein the passive safety mechanism activation plan is determined based on the optimal vehicle orientation for the collision and indicates activation timing for one or more passive safety mechanisms of the vehicle, including one or more of release timings for a set of airbags and release ordering for the set of airbags, at least one passive safety mechanism to be activated prior to the collision;
determining, using at least one data processor of the vehicle, a vehicle path to position the vehicle in the optimal vehicle orientation; and
autonomously controlling the vehicle to travel along the determined vehicle path and controlling activation of passive safety mechanisms of the vehicle according to the passive safety mechanism activation plan.

14. The method of claim 13, wherein the optimal vehicle orientation is determined further based on one or more of locations of passengers in the vehicle, ages of passengers in the vehicle, sizes of passengers in the vehicle, a likelihood of injury to passengers of the vehicle, a likelihood of injury to passengers of other vehicles in the vicinity of the vehicle, a likelihood of injury to pedestrians in the vicinity of the vehicle, and a likelihood of damage to one or more objects in the vicinity of the vehicle.

15. A system, comprising:
one or more processors;
memory;
a set of sensors; and
an autonomous driving system, executable by the one or more processors to:
detect a collision threat based on an environment model for a vehicle generated at least partially based on data from the set of sensors;
determine that a collision between a vehicle and the collision threat is unavoidable based on the environment model and current vehicle dynamics;
determine a collision mitigation plan for the vehicle based on the determination that the collision is imminent, wherein the collision mitigation plan indicates a particular collision orientation for the vehicle, a particular vehicle path, and an activation plan for passive safety mechanisms of the vehicle, wherein the activation plan is determined based on the particular collision orientation for the vehicle and indicates activation timings for the passive safety mechanisms of the vehicle, including one or more of release timings for a set of airbags and release ordering for the set of airbags, activation of at least one passive safety mechanism to occur prior to the collision; and
autonomously control the vehicle to implement the collision mitigation plan.

16. The system of claim 15, wherein the collision mitigation plan further indicates an optimal passenger orientation for the collision, and the autonomous driving system is further executable by the one or more processors to autonomously move one or more seats of the vehicle to position a passenger toward the optimal passenger orientation in advance of the collision.

17. The system of claim 15, further comprising a machine learning model trained based on one or more of static safety information for the vehicle, crash test information for the vehicle, and real-world accident information for the vehicle, wherein the autonomous driving system is to determine the optimal vehicle orientation using the machine learning model.

18. The system of claim 15, wherein the autonomous driving system is to determine the collision mitigation plan based on one or more of locations of passengers in the vehicle, ages of passengers in the vehicle, sizes of passengers in the vehicle, a likelihood of injury to passengers of the vehicle, a likelihood of injury to passengers of other vehicles in the vicinity of the vehicle, a likelihood of injury to pedestrians in the vicinity of the vehicle, and a likelihood of damage to one or more objects in the vicinity of the vehicle.

19. The storage medium of claim 1, wherein the instructions are further executable to cause the machine to perform one or more of the following at or near the time of the collision: disabling one or more components of a fuel system of the vehicle, disabling one or more components of an electrical system of the vehicle, engaging or disengaging one or more door locks of the vehicle, and opening or closing windows of the vehicle.

20. The system of claim 15, wherein the collision mitigation plan further indicates a plan for active safety mechanisms of the vehicle, wherein the plan for the active safety mechanisms includes one or more of disabling one or more components of a fuel system of the vehicle, disabling one or more components of an electrical system of the vehicle, engaging or disengaging one or more door locks of the vehicle, and opening or closing windows of the vehicle.

21. The storage medium of claim 1, wherein determining the passive safety mechanism activation plan comprises determining to an engagement timing for a roll protection mechanism of the vehicle, the roll protection mechanism to be engaged prior to the collision.

22. The system of claim 15, wherein the activation plan for the passive safety mechanisms of the vehicle further indicates an engagement of a roll bar mechanism of the vehicle prior to the collision.

\* \* \* \* \*